United States Patent
Zhu et al.

(10) Patent No.: US 11,566,165 B2
(45) Date of Patent: Jan. 31, 2023

(54) POLYMERS AND NANOPARTICLES FOR FLOODING

(71) Applicant: Saudi Arabian Oil Company, Dhahran (SA)

(72) Inventors: S. Sherry Zhu, Waban, MA (US); Ayrat Gizzatov, Cambridge, MA (US); Marta Antoniv, Cambridge, MA (US)

(73) Assignee: Saudi Arabian Oil Company, Dhahran (SA)

( * ) Notice: Subject to any disclaimer, the term of this patent is extended or adjusted under 35 U.S.C. 154(b) by 184 days.

(21) Appl. No.: 16/883,806

(22) Filed: May 26, 2020

(65) Prior Publication Data

US 2020/0377787 A1  Dec. 3, 2020

Related U.S. Application Data

(60) Provisional application No. 62/854,791, filed on May 30, 2019.

(51) Int. Cl.
| | |
|---|---|
| *C09K 8/588* | (2006.01) |
| *E21B 43/20* | (2006.01) |
| *C08F 212/14* | (2006.01) |
| *C08F 220/06* | (2006.01) |
| *C08F 220/22* | (2006.01) |
| *C08F 220/24* | (2006.01) |
| *C08F 220/56* | (2006.01) |

(52) U.S. Cl.
CPC ............ *C09K 8/588* (2013.01); *C08F 212/20* (2020.02); *C08F 220/06* (2013.01); *C08F 220/22* (2013.01); *C08F 220/24* (2013.01); *C08F 220/56* (2013.01); *E21B 43/20* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 4,772,563 | A | 9/1988 | Evangelista et al. |
| 5,124,268 | A | 6/1992 | Dakubu |
| 5,168,927 | A | 12/1992 | Stegenneier |
| 6,250,848 | B1 | 6/2001 | Moridis et al. |
| 6,252,016 | B1 | 6/2001 | Wu et al. |
| 6,585,044 | B2 | 7/2003 | Rester |
| 6,691,780 | B2 | 2/2004 | Nguyen et al. |

(Continued)

FOREIGN PATENT DOCUMENTS

| | | |
|---|---|---|
| CA | 2997608 | 4/2017 |
| CN | 111741808 * | 1/2008 |

(Continued)

OTHER PUBLICATIONS

PCT International Search Report and Written Opinion issued in International Application No. PCT/US2020/034818 dated Aug. 21, 2020, 14 pages.

(Continued)

*Primary Examiner* — Charles R Nold
(74) *Attorney, Agent, or Firm* — Fish & Richardson P.C.

(57) ABSTRACT

A method and compounds for enhanced oil recovery (EOR) including flooding of a mixture of water and one or more of the compounds in a geological formation. The compounds have a fluoroalkyl group.

5 Claims, 10 Drawing Sheets

(56) References Cited

U.S. PATENT DOCUMENTS

| | | | |
|---|---|---|---|
| 7,032,662 | B2 | 4/2006 | Malone |
| 7,033,975 | B2 | 4/2006 | Baran, Jr. et al. |
| 7,289,942 | B2 | 10/2007 | Yang et al. |
| 7,303,006 | B2 | 12/2007 | Stone |
| 7,472,748 | B2 | 1/2009 | Gdanski et al. |
| 8,148,477 | B2 | 4/2012 | Saita et al. |
| 8,176,981 | B2 | 5/2012 | Savu et al. |
| 8,187,554 | B2 | 5/2012 | Panagiotou |
| 8,269,501 | B2 | 9/2012 | Schmidt et al. |
| 8,418,759 | B2 | 4/2013 | Moore et al. |
| 8,627,902 | B2 | 1/2014 | Hammer |
| 8,629,089 | B2 | 1/2014 | Dams |
| 8,638,104 | B2 | 1/2014 | Barber et al. |
| 8,877,954 | B2 | 11/2014 | Giesenberg et al. |
| 9,023,966 | B2 | 5/2015 | Zhang et al. |
| 9,050,655 | B2 | 6/2015 | Chou et al. |
| 9,080,097 | B2 | 7/2015 | Gupta et al. |
| 9,121,271 | B2 | 9/2015 | Shook |
| 9,133,709 | B2 | 9/2015 | Huh et al. |
| 9,200,102 | B2 | 12/2015 | Baran, Jr. et al. |
| 9,227,929 | B2 | 1/2016 | Winter et al. |
| 9,296,851 | B2 | 3/2016 | Luettgen |
| 9,366,099 | B2 | 6/2016 | Ly |
| 9,375,790 | B2 | 6/2016 | Murphy et al. |
| 9,481,764 | B1 | 11/2016 | Kinlen et al. |
| 9,534,062 | B2 | 1/2017 | He et al. |
| 9,592,555 | B2 | 3/2017 | Schut et al. |
| 9,624,422 | B2 | 4/2017 | Dams et al. |
| 9,719,009 | B2 | 8/2017 | Jangda et al. |
| 9,809,740 | B2 | 11/2017 | Chakraborty et al. |
| 10,273,399 | B2 | 4/2019 | Cox |
| 10,308,865 | B2 | 6/2019 | Cox |
| 10,308,895 | B2 | 6/2019 | Vidal et al. |
| 10,421,894 | B2 | 9/2019 | Johnson et al. |
| 10,487,259 | B2 | 11/2019 | Cox |
| 2003/0220204 | A1 | 11/2003 | Baran et al. |
| 2004/0108110 | A1 | 6/2004 | Zupanick et al. |
| 2004/0143059 | A1 | 7/2004 | Cabrera et al. |
| 2005/0080209 | A1 | 4/2005 | Blankenship et al. |
| 2005/0252286 | A1 | 11/2005 | Ibrahim et al. |
| 2006/0105052 | A1 | 5/2006 | Acar et al. |
| 2007/0114030 | A1 | 5/2007 | Todd et al. |
| 2009/0087911 | A1 | 4/2009 | Rogerio |
| 2009/0087912 | A1 | 4/2009 | Ramos et al. |
| 2009/0248309 | A1 | 10/2009 | Nelville et al. |
| 2009/0253595 | A1 | 10/2009 | Qu et al. |
| 2009/0277625 | A1 | 11/2009 | Bai et al. |
| 2010/0029880 | A1* | 2/2010 | Zhang .............. C09K 8/584 526/287 |
| 2010/0049625 | A1 | 2/2010 | Biebesheimer et al. |
| 2010/0270020 | A1 | 10/2010 | Baran et al. |
| 2010/0307745 | A1 | 12/2010 | Lafitte |
| 2011/0012331 | A1 | 1/2011 | Kim |
| 2011/0030949 | A1 | 2/2011 | Weaver et al. |
| 2011/0129424 | A1 | 6/2011 | Berkland et al. |
| 2011/0239754 | A1 | 10/2011 | Dyer |
| 2011/0320128 | A1 | 12/2011 | Shook |
| 2012/0062886 | A1 | 3/2012 | Piotti et al. |
| 2012/0115128 | A1 | 5/2012 | Miller |
| 2012/0135080 | A1 | 5/2012 | Bromberg et al. |
| 2012/0175120 | A1 | 7/2012 | Holcomb et al. |
| 2012/0193578 | A1 | 8/2012 | Pan et al. |
| 2012/0261617 | A1 | 10/2012 | Pan et al. |
| 2012/0325465 | A1 | 12/2012 | Hammer et al. |
| 2013/0084643 | A1 | 4/2013 | Connnnarieu |
| 2013/0087020 | A1 | 4/2013 | Brutchey et al. |
| 2013/0087329 | A1 | 4/2013 | Hewitt |
| 2013/0087340 | A1 | 4/2013 | Choens et al. |
| 2013/0109261 | A1 | 5/2013 | Koene |
| 2013/0244914 | A1 | 9/2013 | Wu et al. |
| 2013/0296453 | A1 | 11/2013 | Giesenberg et al. |
| 2013/0312970 | A1 | 11/2013 | Lafitte et al. |
| 2013/0341030 | A1 | 12/2013 | Brannon et al. |
| 2014/0060832 | A1 | 3/2014 | Mahoney et al. |
| 2014/0187451 | A1* | 7/2014 | Tamsilian .............. C09K 8/588 507/213 |
| 2014/0190700 | A1 | 7/2014 | Tang et al. |
| 2014/0231077 | A1 | 8/2014 | Rivero et al. |
| 2014/0260694 | A1 | 9/2014 | Szlendak |
| 2014/0323363 | A1 | 10/2014 | Perriat |
| 2015/0013983 | A1 | 1/2015 | Alwattari |
| 2015/0050741 | A1 | 2/2015 | Tour et al. |
| 2015/0118501 | A1 | 4/2015 | Lu |
| 2015/0132543 | A1 | 5/2015 | Nouzille et al. |
| 2015/0159079 | A1 | 6/2015 | Huh et al. |
| 2015/0268370 | A1 | 9/2015 | Johnston et al. |
| 2015/0368547 | A1 | 12/2015 | Lesko et al. |
| 2015/0376493 | A1 | 12/2015 | Huh et al. |
| 2016/0003040 | A1 | 1/2016 | Jessheim et al. |
| 2016/0040514 | A1 | 2/2016 | Rahmani et al. |
| 2016/0061020 | A1 | 3/2016 | Sayarpour |
| 2016/0083641 | A1 | 3/2016 | Gamage |
| 2016/0097750 | A1 | 4/2016 | Van Herzen |
| 2016/0264846 | A1 | 9/2016 | Bennetzen et al. |
| 2017/0199124 | A1 | 7/2017 | Bolduc et al. |
| 2018/0275114 | A1 | 9/2018 | Kosynkin |
| 2019/0368336 | A1 | 12/2019 | Hammond et al. |
| 2020/0116019 | A1 | 4/2020 | Ow et al. |

FOREIGN PATENT DOCUMENTS

| | | |
|---|---|---|
| CN | 101475667 | 7/2009 |
| CN | 102649831 | 8/2012 |
| CN | 103275270 | 9/2013 |
| CN | 104341799 | 1/2016 |
| CN | 106833591 | 6/2017 |
| CN | 107915802 | 4/2018 |
| CN | 106008852 | 8/2018 |
| EP | 1721603 | 11/2006 |
| EP | 2480625 | 4/2013 |
| EP | 2480626 | 4/2013 |
| GB | 2489714 | 10/2012 |
| JP | 06192342 | * 1/2008 |
| WO | WO 2004095259 | 11/2004 |
| WO | WO 2010138914 | 12/2010 |
| WO | WO 2011035294 | 3/2011 |
| WO | WO 2011063023 | 5/2011 |
| WO | WO 2011035292 | 10/2011 |
| WO | WO 2012052148 | 4/2012 |
| WO | WO 2012154332 | 11/2012 |
| WO | WO 2012158478 | 11/2012 |
| WO | WO 2013142869 | 9/2013 |
| WO | WO 2014066793 | 5/2014 |
| WO | WO 2014207075 | 12/2014 |
| WO | WO 2015044446 | 4/2015 |
| WO | WO 2015097116 | 7/2015 |
| WO | WO 2015200060 | 12/2015 |
| WO | WO 2017136641 | 8/2017 |
| WO | WO 2018085504 | 5/2018 |
| WO | WO 2018234431 | 12/2018 |

OTHER PUBLICATIONS

Agenet et al., "Fluorescent Nanobeads: a First Step Toward Intelligent Water Tracers," Society of Petroleum Engineers, presented at the SPE International Oilfield Nanotechnology Conference held in Noordwijk, the Netherlands, Jun. 12-14, 2012, 13 pages.

Alfazazi et al., "Screening of New HPAM Base Polymers for Applications in High Temperature and High Salinity Carbonate Reservoirs," SPE-192805-MS, 2018.

Allard and Larpent, "Core-shell type dually fluorescent polymer nanoparticles for ratiometric pH-sensing," J. Polym. Sci., Part A: Polym. Chem. 46(18): 6206-6213, 2008, 8 pages.

Al-Muntasheri et al., "Nanoparticle-Enhanced Hydraulic-Fracturing Fluids: A Review," SPE185161-PA, Society of Petroleum Engineers, SPE Production & Operations 32:02, May 2017, 10 pages.

Anisimov, "SPE 118862: The Use of Tracers for Reservoir Characterization," Society of petroleum Engineers (SPE), presented at SPE Middle East Oil and Gas Show and Conference, Mar. 15-18, 2009, 8 pages.

(56) References Cited

OTHER PUBLICATIONS

Armelao et al., "Design of luminescent lanthanide complexes: From molecules to highly efficient photo-emitting materials," Coordination Chemistry Reviews, vol. 254, 5-6, Mar. 2010, 19 pages.
Aslan et al., "Fluorescent Core—Shell AG@$SiO_2$ Nanocomposites for Metal-Enhanced Fluorescence and Single Nanoparticle Sensing Platforms," Jan. 19, 2007, 2 pages.
Badgett et al., "Totalsynthese eines Neobetanidin-Derivates und des Neobetenamins," Helvetica Chimica Acta, 1970, 53(2): 433-448, English Summary.
Bagaria et al., "Iron Oxide Nanoparticles Grafted with Sulfonated Copolymers are Stable in Concentrated Brine at Elevated Temperatures and Weakly Adsorb on Silica," ACS Applied Materials & Interfaces, vol. 5, No. 8 (3329-3339), Mar. 25, 2013, 11 pages.
Bala et al., "Interaction of Different Metal Ions with Carboxylic Acid Group: A Quantitative Study," The Journal of Physical Chemistry A, vol. 111, No. 28 (6183-6190), Jun. 2007, 8 pages.
Bao et al., "Luminescence properties of the co-luminescence groups of Sm-La-pyridyl carboxylic acids," Journal of Rare Earths, 30(4), 320-324, Apr. 2012, 5 pages.
Behnke et al., "Encapsulation of Hydrophobic Dyes in Polystyrene Micro- and Nanoparticles via Swelling Procedures." J. Fluoresc. 21(3): 937-944, 2011, 8 pages.
Borrini et al., "Water Soluble PDCA Derivatives for Selective Ln(III)/An(III) and Am(III)/Cm(III) Separation," Solvent Extraction and Ion Exchange, 33(3), 224-235, Oct. 2014, 30 pages.
Brichart et al., "The Use of Fluorescent Tracers for Inhibitor Concentration Monitoring Useful for Scale Inhibitor," International Petroleum Technology Conference, IPTC-17933-MS, presented at the International Petroleum Technology Conference held in Kuala Lumpur, Dec. 10-12, 2014, 8 pages.
Bunzli and Piguet, "Taking advantage of luminescent lanthanide ions," Chemical Society Reviews, vol. 34, Issue 12 (1048-1077) Sep. 2005, 30 pages.
Chang et al., "Magnetic SERS Composite Nanoparticles for Microfluidic Detection," 251st ACE National Meeting, Mar. 13-17, 2016, 1 pages.
Chen et al., "Aggregation Kinetics of Alginate-Coated Hematite Nanoparticles in Monovalent and Divalent Electrolytes," Environmental Science & Technology, vol. 40, No. 5 (1516-1523), Mar. 2006, 8 pages.
Chen et al., "Analysis of the solution conformations of T4 lysozyme by paramagnetic NMR spectroscopy," Physical Chemistry Chemical Physics (2016), 18(8), 5850-5859, 10 pages.
Chen et al., "Hydration Repulsion between Carbohydrate Surfaces Mediated by Temperature and Specific Ions," Scientific Reports, vol. 6 (1-10), Jun. 23, 2016, 10 pages.
Chen et al., "Impact of Irreversible Retention on Tracer Deployments; Constraining Novel Material Deployments," SPE 188890-MS, in SPE Abu Dhabi International Petroleum Exhibition and Conference, Society of Petroleum Engineers, Nov. 2017, 8 pages.
Chen et al., "Improved Reservoir History Matching and Production Optimization with Tracer Data," SPE 191523-MS, in SPE Annual Technical Conference and Exhibition, Society of Petroleum Engineers, Sep. 2018, 15 pages.
Chen et al., "Semicontinuous Monomer-Starved Emulsion Polymerization as a Means to Produce Nanolatexes: Analysis of Nucleation Stage," Langmuir, 29: 5650-5658, 2013, 9 pages.
Chen et al., "FITC functionalized magnetic core-shell $Fe_3O_4$/Ag hybrid nanoparticle for selective determination of molecular biothiols," Elsevier Ltd., Dec. 2013, 7 pages.
Chuang et al., "Ultra-sensitive in-situ detection of novel near-infrared persistent luminescent tracer nanoagents in crude oil-water mixtures," a nature research journal, Scientific Reports, Jun. 15, 2016, 5 pages.
Clark et al., "Water-Soluble Fluorochemical Surfactant Well Stimulation Additives," SPE9008, Society of Petroleum Engineers, Journal of Petroleum Technology, vol. 34, Issue 07, Jul. 1982, 5 pages.

Coates et al., "Enhancement of luminescence of europium(m) ions in water by use of synergistic chelation. Part 1.1 : 1 and 2 : 1 complexes," J. Chem. Soc, Perkin Trans., Jan. 1, 1996 (Jan. 1, 1996), pp. 1275-1282.
Cole et al., "Polyethylene Glycol Modified, Cross-Linked Starch-Coated Iron Oxide Nanoparticles for Enhanced Magnetic tumor Targeting," Biomaterials, vol. 32, No. 8 (2183-2193), Mar. 1, 2011, 11 pages.
Corning Incorporated, "12.10G1 Fluidic Modules Description," in 09-CD, MG1 HP Instruction Manual, 5 ed.; Corning, Ed. pp. 78-79, 2016, 2 pages.
Corning, "The future flows through Corning Advanced Flow-Reactors," G1 Reactor. Corning, Ed. 2016, 3 pages.
Cox et al., "Pyrolyzable Nanoparticle Tracers for Environmental Interrogation and Monitoring," ACS Appl. Mater. Interfaces 9, 2017, 10 pages.
Cubillos et al., "SPE 174394-MS: The Value of Inter-well and Single Well Tracer Technology for De-Risking and Optimizing a CEOR Process—Caracara Field Case," Society of Petroleum Engineers (SPE), presented at EUROPEC 2015, Jun. 1-4, 2015, 19 pages.
Das et al., "Molecular Fluorescence, Phosphorescence, and Chemiluminescence Spectrometry," Analytical Chemistry, Nov. 3, 2011, 29 pages.
Deans, "SPE 7076: Using Chemical Tracers To Measure Fractional Flow And Saturation In-Situ," Society of Petroleum Engineers (SPE), presented at SPE Symposium on improved Methods of Oil Recovery, Apr. 16-17, 1978, 10 pages.
Deschamps et al., "Drilling to the Extreme: the Micro-Coring Bit Concept," IADC/SPE 115187, presented at the IADC/SPE Asia Pacific Drilling Technology Conference and Exhibition, Aug. 25-27, 2008, 12 pages.
Desmette et al., "Drilling Hard and Abrasive Rock Efficiently, or Generating Quality Cuttings? You No Longer Have to Choose . . . ," SPE 116554, Society of Petroleum Engineers, 2008 SPE Annual Technical Conference and Exhibition, Sep. 21-24, 2008, 19 pages.
Doda et al., "Investigation of Alkali Resistant Polymer for Improved Heavy Oil Recovery," SPE 165514, presented at SPE Heavy Oil Conference-Canada, Society of Petroleum Engineers, Jun. 2013, 15 pages.
Du and Guan, "Interwell tracer tests: lessons learned from past field studies," SPE 93140-MS, in SPE Asia Pacific Oil and Gas Conference and Exhibition, Society of Petroleum Engineers, Apr. 5-7, 2005, 9 pages.
Dugstad, "Chapter 6: Well-to-well tracer tests," in Petroleum Engineering Handbook, 5, pp. 651-683, 2007, 31 pages.
Edwards et al., "Extending the distance range accessed with continuous wave EPR with Gd3+ spin probes at high magnetic fields," Physical Chemistry Chemical Physics, 15(27), 11313-11326, 2013, 14 pages.
El-Aneed et al., "Mass Spectrometry, Review of the Basics: Electrospray, MALDI, and Commonly Used Mass Analyzers," Applied Spectroscopy Reviews, Mar. 16, 2009, 22 pages.
Esumi et al., "Interaction between Zwitterionic Fluorocarbon and Anionic Surfactants in Aqueous Solutions," Langmuir, 9(358-360), 1993, 3 pages.
Fernández et al., "Evaluation of Cationic Water-Soluble Polymers With Improved Thermal Stability," SPE 93003, presented at SPE International Symposium on Oilfield Chemistry, Society of Petroleum Engineers, Feb. 2005, 13 pages.
Freeze and Cherry, "Chapter 9: Groundwater Contamination," in Groundwater, Englewood Cliffs, NJ: Prentice-Hall, Inc., p. 604, 1979, 80 pages.
Gaillard et al., "New Water Soluble Anionic NVP Acrylamide Terpolymers for Use in Harsh EOR Conditions," SPE-169108-MS, presented at SPE Improved Oil Recovery Symposium, Society of Petroleum Engineers, Apr. 2014, 18 pages.
Gaillard et al., "Selection of Customized Polymers to Enhance Oil Recovery from High Temperature Reservoirs," SPE-177073-MS, presented at the SPE Latin American and Caribbean Petroleum Engineering Conference, Society of Petroleum Engineers, Nov. 2015, 15 pages.

(56) References Cited

OTHER PUBLICATIONS

Galdiga and Greibrokk, "Ultra-trace determination of flurinated aromatic carboxylic acids in aqueous reservoir fluids using solid-phase extraction in combination with gas chromatography-mass spectrometry," Journal of Chromatography, vol. 793, Issue 2, Jan. 16, 1998, 10 pages.

Gardiner et al., "Practical Raman Spectroscopy," Springer-Verlag, 1989, 9 pages.

George et al., "Modified Dipicolinic Acid Ligands for Sensitation and Europium (III) Luminescence," Inorganic Chemistry, vol. 45, No. 4, Feb. 1, 2006, 6 pages.

Georgi, et al., "Advances in Cuttings Collection and Analysis," SPWLA 34th Annual Logging Symposium, Jun. 13-16, 1993, 20 pages.

Goerke et al., "Analysis of the Transfer of Radical Co-polymerisation Systems from Semi-batch to Continuous Plants," in 12th International Symposium on Process Systems Engineering and 25th European Symposium on Computer Aided Process Engineering, Elsevier B.V, Copenhagen, Denmark, 2015, 6 pages.

Gordon-Grossman et al., "W-Band pulse EPR distance measurements in peptides using Gd3+-dipicolinic acid derivatives as spin labels," Physical Chemistry Chemical Physics, 13(22), 10771-10780, 2011, 10 pages.

Grutzke et al., "Heptacoordinate Heteroleptic Salan (ONNO) and Thiosalan (OSSO) Titanium(IV) Complexes: Investigation of Stability and Cytotoxicity," Inorganic Chemistry 54(14), 6697-6706, Jul. 2015, 10 pages.

Hagoot, "The response of interwell tracer tests in watered-out reservoirs," SPE 11131-MS, in SPE Annual Technical Conference and Exhibition, Society of Petroleum Engineers, Jan. 1982, 21 pages.

Han et al., "Application of Silver-Coated Magnetic Microspheres to a SERS-Based Optofluidic Sensor," The Journal of Physical Chemistry (JPCC), Mar. 7, 2011, 7 pages.

He et al., "Luminescent Europium Chelates Synthesis and Fluorescence Properties," Sensors and Materials (2007), 19(2), 123-132, 10 pages.

Hu et al., "Smart Liquid SERS Substrates based on $Fe_3O_4$/Au Nanoparticles with Reversibility Tunable Enhancement Factor for Practical Quantitative Detection," a nature research journal, Scientific Reports, Nov. 27, 2014, 10 pages.

Huseby et al., "Assessing EOR potential from partitioning tracer data," SPE 172808-MS, in SPE Middle East Oil and Gas Show and Conference, Society of Petroleum Engineers, Mar. 2015, 15 pages.

Huseby et al., "SPE-169183-MS: High Quality Flow Information from Tracer Data," Society of Petroleum Engineers (SPE), presented at the SPE Bergen One Day Seminar, Apr. 2, 2014, 9 pages.

Hutchins et al., "SPE-21049: Aqueous Tracers for Oilfield Applications," Society of Petroleum Engineers (SPE), presented at SPE International Symposium on Oilfield Chemistry, Feb. 20-22, 1991, 9 pages.

Jangda et al., "Evaluation of Fluorosurfactant Performance with Super-Critical CO2 Flooding for High Salinity Carbonate Reservoirs," SPE-169725-MS, presented at the SPE EOR Conference at Oil and Gas West Asia, Society of Petroleum Engineers, Mar. 2014, 14 pages.

Jenkins et al., "Ultratrace Determination of Selected Lanthanides by Luminescence Enhancement," Analytical Chemistry, vol. 68, No. 17, Jan. 1, 1996, 7 pages.

Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.

Junkers, "Precision Polymer Design in Microstructured Flow Reactors: Improved Control and First Upscale at Once," Macromol. Chem. Phys. 218: 1600421-1600421, 2016, 9 pages.

Kaushik et al., "Gd(III) and Mn(II) complexes for dynamic nuclear polarization: small molecular chelate polarizing agents and applications with site-directed spin labeling of proteins," Physical Chemistry Chemical Physics, 18(39), 27205-27218, 2016, 36 pages.

Khan et al., "Optimizing waterflood management in a giant UAE carbonate oil field using simulation-based streamlines," SPE 171777-MS, in Abu Dhabi International Petroleum Exhibition and Conference, Society of Petroleum Engineers, Nov. 10-13, 2014, 9 pages.

Kneipp et al., "Single Molecule Detection Using Surface-Enhanced Raman Scattering (SERS)," Physical Review Letters, American Physical Society vol. 78, No. 9, Mar. 3, 1997, 4 pages.

Knowles et al., "Zwitterion Functionalized Silica Nanoparticle Coatings: The Effect of Particle Size on Protein, Bacteria, and Fungal Spore Adhesion," Langmuir, 35(5): 1335-1345, 2019, 11 pages.

Kornberger and Thiele, "Experiences with an Efficient Rate-Management Approach for the 8th Tortonian Reservoir in the Vienna Basin," SPE 166393-PA, SPE Reservoir Evaluation and Engineering, vol. 17, No. 2, May 2014, 12 pages.

Kosynkin and Alaskar, "Oil Industry First Interwell Trial of Reservoir Nanoagent Tracers," SPE 181551-MS, in SPE Annual Technical Conference and Exhibition, Society of Petroleum Engineers, Sep. 2016, 15 pages.

Kramer, "Water-Soluble Dendritic Architectures with Carbohydrate Shells for the Templation and Stabilization of Catalytically Active Metal Nanoparticles," published by ACS, Macromolecules, vol. 38, No. 20 (8308-8315), Aug. 27, 2005, 8 pages.

Kulawardana et al., "Rheology and Transport of Improved EOR Polymers under Harsh Reservoir Conditions," SPE 154294, presented at the SPE Improved Oil Recovery Symposium, Society of Petroleum Engineers, Apr. 2012, 14 pages.

Labbe et al., "Development of metal-chelating inhibitors for the Class II fructose 1,6-bisphosphate (FBP) aldolase," Journal of Inorganic Biochemistry, 112, 49-58, Jul. 2012, 10 pages.

Larsen et al, "Efficient Synthesis of 4,7-Diamino Substituted 1,10-Phenanthroline-2,9-dicarboxamides," Organic Letters, vol. 13, No. 13, Jul. 1, 2011 (Jul. 1, 2011), pp. 3546-3548.

Levitt et al., "Selection and Screening of Polymers for Enhanced-Oil Recovery," SPE 113845, presented at the SPE Symposium on Improved Oil Recovery, Society of Petroleum Engineers, Apr. 2008, 18 pages.

Li et al., "Magic Angle Spinning NMR Structure Determination of Proteins from Pseudocontact Shifts," Journal of the American Chemical Society, 135(22), 8294-8303, May 2013, 10 pages.

Li et al., "Thiol-ene reaction: a versatile tool in site-specific labelling of proteins with chemically inert tags for paramagnetic NMR," Chemical Communications, Cambridge, United Kingdom, 48(21), 2704-2706, 2012, 18 pages.

Manna et al, "Complexation behavior of trivalent actinides and lanthanides with 1,10-phenanthroline-2,9-dicarboxylic acid based ligands: insight from density functional theory," Physical Chemistry Chemical Physics, vol. 14, No. 31, Jan. 1, 2012 (Jan. 1, 2012), p. 11060.

Marais et al., "Time-Resolved Fluorescence for Real-Time Monitoring of Both Scale and Corrosion Inhibitors: a Game-Changing Technique," SPE 179867, Society of Petroleum Engineers, presented at the SPE International Oilfield Scale Conference and Exhibition held in Aberdeen, Scotland, May 11-12, 2016 11 pages.

Marchetti et al., "Fluorous affinity chromatography for enrichment and determination of perfluoroalkyl substances," Annual Review of Analytical Chemistry vol. 84, Jul. 19, 2012, 8 pages.

Martinez et al., "Polysaccharide-based Nanoparticles for Controlled Release Formulations," The Delivery of Nanoparticles, (185-222), May 2012, 39 pages.

Martini et al., "How to Monitor Scale Inhibitor Squeeze using Simple TRF Tracers," Society of Petroleum Engineers, presented at the SPE International Symposium on Oilfield Chemistry held in the Woodlands, Texas, Apr. 13-15, 2015, 8 pages.

Melton et al., "Complexes of Greatly Enhanced Thermodynamic Stability and Metal Ion Size-Based Selectivity, Formed by the Highly Preorganized Non-Macrocyclic Ligand 1,10-Phenanthroline-2,9-dicarboxylic Acid: A Thermodynamic and Crystallographic Study," Inorganic Chemistry, vol. 45, No. 23, Nov. 1, 2006 (Nov. 1, 2006), pp. 9306-9314.

Miller and McQuade, "5 Synthesis of Materials I Flow—Principles and Practice," from De Gruyter et al., Flow Chemistry, vol. 2, 2014, Part II, Chapter 5, pp. 133-160, 28 pages.

(56) References Cited

OTHER PUBLICATIONS

Mohamed et al., "Reaction screening in continuous flow reactors," J. Tetrahedron Letters, 57: 3965-3977, 2016, 12 pages.
Morse et al., "Enhanced Reaction Efficiency in Continuous Flow," Isr. J. Chem, 57:218-227, Apr. 2017, 14 pages.
Moyner et al., "The Application of Flow Diagnostics for Reservoir Management," Society of Petroleum Engineers (SPE), Apr. 2015, 18 pages.
Muller and Seubert, "Ultra trace determination of fluorobenzoic acids in tap and reservoir water using solid-phase extraction and gas chromatography-mass spectrometry," Journal of Chromatography A, 1260, Oct. 2012, 7 pages.
Musyanovych et al., "Preparation of Biodegradable Polymer Nanoparticles by Miniemulsion Technique and Their Cell Interactions," Macromolecular Bioscience, vol. 8, Issue 2, Feb. 11, 2008, 13 pages.
Ogden et al, "Complexation of Am(III) and Nd(in) by 1,10-Phenanthroli ne-2,9-Di carboxylic Acid," Journal of Solution Chemistry, vol. 42, No. 1, pp. 211-225, 2013, 15 pages.
Ouali et al., "Analysis of Paramagnetic NMR Spectra of Triple-Helical Lanthanide Complexes with 2,6-Dipicolinic Acid Revisited: A New Assignment of Structural Changes and Crystal-Field Effects 25 Years Later," Inorganic Chemistry, 41(6), 1436-1445, Feb. 2002, 10 pages.
Parker and Williams, "Getting excited about lanthanide complexation chemistry," Journal of the Chemical Society, Dalton Transactions, vol. 18, 1996, 16 pages.
Parker et al., "Being excited by lanthanide coordination complexes: aqua species, chirality, excited-state chemistry, and exchange dynamics," Chemical Reviews, vol. 102, Issue 6, May 2002, 34 pages.
Petoud et al., "Brilliant SM, Eu, Tb, and Dy Chiral Lanthanide Complexes with Strong Circularly Polarized Luminescence," Journal for the American Chemical Society (JACS), Dec. 15, 2006, 7 pages.
Potapov et al., "Nanometer-Scale Distance Measurements in Proteins Using Gd3+ Spin Labeling," Journal of the American Chemical Society, 132(26), 9040-9048, Jun. 2010, 9 pages.
Qianming et al., "Bspda Synthesis and its Europium (III) Complexes' Fluorescence," Chemical Industry Times, Jul. 2005, 19(7): 38-41, English Abstract.
Quadri et al., "Screening of Polymers for EOR in High Temperature, High Salinity and Carbonate Reservoir Conditions," IPTC-18436-MS, presented at the International Petroleum Technology Conference, Dec. 2015, 30 pages.
Reisch and Klymchenko, "Fluorescent Polymer Nanoparticles Based on Dyes: Seeking Brighter Tools for Bioimaging." Small 12(15): 1968-1992 2016, 48 pages.
Rowan et al., "Dynamic Covalent Chemistry," Angewante Chemie International Edition, Mar. 15, 2002, 55 pages.
Sabbatini et al., "Luminescent lanthanide complexes as photochemical supramolecular devices," Coordination Chemistry Reviews, vol. 123, issue 1-2, Feb. 1993, 28 pages.
Sabhapondit et al., "Water Soluble Acrylamidomethyl Propane Sulfonate (AMPS) Copolymer as an Enhanced Oil Recovery Chemical," Energy & Fuels, 17:683-688, 2003, 6 pages.
Saeki et al., "Upper and lower critical solution temperatures in poly (ethylene glycol) solutions," Polymer, vol. 17, No. 8, (685-689), Aug. 1976, 5 pages.
Sajjadi, "Nanoparticles Formation by Monomer-Starved Semibatch Emulsion Polymerization," Langmuir, 23(1018-1024), 2007, 7 pages.
Sajjadi, "Particle Formation under Monomer-Starved Conditions in the Semibatch Emulsion Polymerization of Styrene. I. Experimental. ," Journal of Polymer Science: Part A: Polymer Chemistry, 39: 3940-3952, 2001, 13 pages.
Sammes and Yshioglu, "Modern bioassays using metal chelates as luminescent probes," Natural Product Reports, vol. 31, No. 1, 1996, 28 pages.
Sanni et al., "A field case study of inter-well chemical tracer test," in SPE International Symposium on Oilfield Chemistry, Society of Petroleum Engineers, Apr. 2015, 17 pages.
Sanni et al., "Pushing the envelope of residual oil measurement: A field case study of a new class of inter-well chemical tracers," Journal of Petroleum Science and Engineering, vol. 163, 2018, 19 pages.
Santarelli et al., "Formation Evaluation From Logging on Cuttings," SPE Reservoir Evaluation and Engineering, presented at the 1996 SPE Permian Basin Oil and Gas Recovery Conference, Mar. 27-29, 1996, published Jun. 1998, 7 pages.
Schmidt et al., "Copper dipicolinates as peptidomimetic ligands for the Src SH2 domain," Bioorganic & Medicinal Chemistry Letters, 14(16), 4203-4206, Aug. 2004, 4 pages.
Schmidt et al., "Synthesis of Mono- and Dinuclear Vanadium Complexes and Their Reactivity toward Dehydroperoxidation of Alkyl Hydroperoxides," Inorganic Chemistry 56(3), 1319-1332, 2017, 14 pages.
Selvin et al., "Principles and biophysical applications of lanthanide-based probes," Annual Review of Biophysics and Biomolecular Structure, Jun. 2002, 28 pages.
Serres-Piole et al., "Direct sensitive simultaneous determination of fluorinated benzoic acids in oil reservoir waters by ultra high-performance liquid chromatography-tandem mass spectrometry," Journal of Chromatography A, 1218, Aug. 2011, 6 pages.
Serres-Piole et al., "Water tracers in oilfield applications: Guidelines," Elsevier Ltd., Journal of Science and Engineering, Nov. 2012, 18 pages.
ShamsiJazeyi et al., "Polymer-Coated Nanoparticles for Enhance Oil Recovery," Journal of Applied Polymer Science, vol. 131, No. 15, Aug. 5, 2014, 13 pages.
Shook et al., "SPE 124614: Determining Reservoir Properties and Flood Performance from Tracer Test Analysis," Society of petroleum Engineers (SPE), presented at SPE Annual Technical Conference and Exhibition, Oct. 4-7, 2009, 19 pages.
Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.
Stiles et al., "Surface-enhanced Raman Spectroscopy," Annual Review of Analytical Chemistry, Mar. 18, 2008, 29 pages.
Stryer et al., "Diffusion-enhanced fluorescence energy transfer," Annual Review of Biophysics and bioengineering, vol. 11, Issue 1, 1982, 21 pages.
Su et al., "A Dipicolinic Acid Tag for Rigid Lanthanide Tagging of Proteins and Paramagnetic NMR Spectroscopy," Journal of the American Chemical Society, 130(32), 10486-10487, Jul. 2008, 2 pages.
Tang et al., "Synthesis and fluorescence properties of Tb(III) complexes with pyridine-2,6-dicarboxylic acid derivatives," Journal of Central South University of Technology (English Edition), 15(5), 599-605, Oct. 2008, 7 pages.
Tang et al., "Synthesis of Novel Derivatives of Pyridine-2,6-dicarboxylic Acid," Synthetic Communications: An International Journal for Rapid Communication of Synthetic Organic Chemistry, 36(14), 2027-2034, Jun. 2006, 9 pages.
Tang et al., "Synthesis of Eu(III) and Tb(III) Complexes with Novel Pyridine-2,6-Dicarboxylic Acid Derivatives and Their Fluorescence Properties," Front. Chem. China, 2006, 4: 408-413.
Taylor et al., "Water-Soluble Hydrophobically Associating Polymers for Improved Oil Recovery: A Literature Review," SPE 29008, Journal of Petroleum Science and Engineering, vol. 19, Issue 3-4 (265-280), Mar. 1998, 16 pages.
Tian et al., "Off-Resonant Gold Superstructures as Ultrabright Minimally Invasive Surface-Enhanced Raman Scattering (SERS) Probes," American Chemical Society, Jul. 2015, 7 pages.
Toulhoat, "Experimentation and Modelling of U, Th and Lanthanides Transport in Fissured Rocks: Influence of Complexation," MRS Proceedings, vol. 50, Jan. 1, 1985, 8 pages.
Vaccaro et al., "Flow Approaches Towards Sustainability," Green Chem, 16:3680-3704, 2014, 25 pages.
Vermolen et al., "Pushing the Envelope for Polymer Flooding Towards High-temperature and High-salinity Reservoirs with Polyacrylamide Based Terpolymers," SPE 141497, presented at SPE Middle East Oil and Gas Show and Conference, Society of Petroleum Engineers, Mar. 2011, 9 pages.

(56) References Cited

OTHER PUBLICATIONS

Vollrath et al., "Fluorescence imaging of cancer tissue based on metal-free polymeric nanoparticles—a review." J. Mater. Chem. B 1(15): 1994-2007, 2013, 15 pages.

Wang et al., "The Design and Implementation of a Full Field Inter-Well Tracer Program on a Giant UAE Carbonate Oil Field," in Abu Dhabi International Petroleum Exhibition and Conference, Society of Petroleum Engineers, SPE-177527-MS, Nov. 2015, 8 pages.

Wever et al., "Polymers for enhanced oil recovery: A paradigm for structure-property relationship in aqueous solution," Progress in Polymer Science, 2011. 36:11 (1558-1628), Nov. 2011, 71 pages.

Wu et al., "Development of New Polymers with Better Performance under Conditions of High Temperature and High Salinity," SPE 155653, SPE EOR Conference at Oil and Gas, Society of Petroleum Engineers, Apr. 16-18, 2012, 11 pages.

Wu et al., "A reusable biosensor chip for SERS-fluorescence dual mode immunoassay," Proc. SPIE 9543, Third International Symposium on Laser Interaction with Matter, 954317, May 4, 2015, 6 pages.

Wu et al., "A SERS-Assisted 3D Barcode Chip for High-Throughput Biosensing," Small Journal vol. 11, No. 23, Jun. 11, 2015, 9 pages.

Xu et al., "Measurement of two-photon excitation cross sections of molecular fluorophores with data from 690 to 1050 nm," Journal of the Optical Society of America B, Mar. 1996, 11 pages.

Yang et al., "The Co-Luminescence Groups of Sm-La-pyridyl Carboxylic Acids and the Binding Characteristics between the Selected Doped Complex and Bovine Serum Albumin," Bulletin of the Korean Chemical Society 33(4), 1303-1309, Apr. 20, 2012, 7 pages.

Yang et al., "Paramagnetic labeling of proteins and pseudocontact shift in structural biology," Chinese Journal of Magnetic Resonance, 2014, 31(2):155-171, English Abstract.

Ye et al., "Synthesis and Characterization of a Water-Soluble Sulfonates Copolymer of Acrylamide and N-Allylbenzamide as Enhanced Oil Recovery Chemical," Journal of Applied Polymer Science, vol. 128, Issue 3, (2003-2011), May 5, 2013, 9 pages.

Zamberi et al., "SPE 166005: Improved Reservoir Surveillance Through Injected Tracers In A Saudi Arabian Field: Case Study," Society of Petroleum Engineers (SPE), presented at SPE Reservoir Characterization and Simulation Conference and Exhibition, Sep. 16-18, 2013, 15 pages.

Zemel, "Chapter 3: Tracers in the Oil Field," in Tracers in the Oil Field, Technology and Engineering, Elsevier, vol. 43, Jan. 1995, 47 pages.

Zhang et al., "Effect of Concentration on HPAM Retention in Porous Media," SPE-166265-PA, presented as SPE Annual Technical Conference and Exhibition, Society of Petroleum Engineers, (373-380), Sep. 30-Oct. 2, 2013, 11 pages.

Zhao et al., "Chromatographic Separation of Highly Soluble Diamond Nanoparticles Prepared by Polyglycerol Grafting," Angewandte Chemie International Edition, vol. 50, No. 6 (1388-1392), Feb. 7, 2011, 5 pages.

Zhou et al., "Upconversion luminescent materials: advances and applications," Chem Rev., Jan. 14, 2015, 71 pages.

GCC Examination Report in Gulf Cooperation Council Appln. No. GC 2020-39841, dated Aug. 8, 2021, 4 pages.

\* cited by examiner

POLYMERS AND NANOPARTICLES FOR FLOODING

CROSS-REFERENCE TO RELATED APPLICATION

This application claims the benefit of priority to U.S. Provisional Patent Application Ser. No. 62/854,791, filed May 30, 2019, the contents of which are hereby incorporated by reference herein.

TECHNICAL FIELD

This disclosure relates to flooding in enhanced oil recovery (EOR).

BACKGROUND

Oil production may be separated into at least the three phases of primary, secondary, and tertiary. Primary recovery (for example, via pressure depletion) and secondary oil recovery (for example, via water injection) in combination generally recover about 20% to 50% of original oil in place (OOIP). Therefore, a large amount of oil (for example, at least 50% of the crude oil in the reservoir) typically remains in the reservoir or geological formation after these conventional oil-recovery processes of primary recovery and secondary recovery. Primary and secondary recovery of production can leave up to 75% of the crude oil in the well. Primary oil recovery is generally limited to hydrocarbons that naturally rise to the surface or recovered via artificial lift devices such as pumps. Secondary recovery employs water and gas injection to displace oil to the surface.

A way to further increase oil production is through tertiary recovery also known as enhanced oil recovery (EOR). EOR or tertiary oil recovery increases the amount of crude oil or natural gas that can be extracted from a reservoir or geological formation. Although typically more expensive to employ on a field than conventional recovery, EOR can increase production from a well up to 75% recovery or more. For example, EOR may extract 30% to 60% or more of reservoir oil compared to 20% to 40% recovery of reservoir oil employing primary and secondary recovery. EOR or tertiary recovery can extract crude oil from an oil field that cannot be extracted otherwise. There are different EOR or tertiary techniques.

Polymer flooding (also called polymer waterflooding) is an EOR technique. In a polymer waterflood, a viscosity-enhancing polymer is added to the water of the waterflood to decrease the mobility of the flood water and thus improve the sweep efficiency of the waterflood. A purpose of adding polymer to a waterflood may be to increase the viscosity of the flood water. Polymer waterflooding may be beneficial where the reservoir is heterogeneous. Polymer in waterflooding generally promotes improved sweep efficiency by decreasing the mobility ratio. Improved sweep efficiency imparted during polymer waterflooding may be experienced due to the polymer increasing the viscosity of the waterflood drive fluid.

The mobility ratio may describe the waterflooding displacement efficiency. The mobility ratio may be defined as the ratio of the mobility of the displacing fluid to the mobility of the displaced fluid. If the mobility ratio is greater than one, the flood may be unstable. In contrast, a flood may be deemed stable and displacement efficient for a mobility ratio of less than one. When polymer in solution flows through reservoir matrix rock, the polymer may impose a mobility reduction that is typically the primary conformance-improvement benefit of polymer waterflooding.

Polymer retention during flow through reservoir matrix rock is a variable in polymer waterflooding. During a polymer flood, polymer retention can have an impact on the rate of polymer propagation through a reservoir and thus impact the crude oil recovery. The manner in which polymer solution flows through porous rock and the associated polymer interaction with the pore walls of matrix reservoir rock may affect the technical and economic results of a polymer flood. In some applications, the amount of crude oil recovered per pound of polymer injected may be inversely related to polymer retention.

SUMMARY

An aspect relates to a method of enhanced oil recovery (EOR). The method includes injecting a mixture through a wellbore into a geological formation. The mixture includes water and a compound. The compound has a fluoroalkyl group. The method include flooding the geological formation with the mixture.

Another aspect is method including pumping a mixture through a wellbore into a geological formation. The mixture includes polymer and water. The polymer has a fluoroalkyl group. The method includes flowing the mixture through the geological formation. The pumping and the flowing give EOR flooding which may be polymer flooding.

Yet another aspect relates to a method including injecting a mixture through a wellbore into a geological formation. The mixture includes nanoparticles and water. The nanoparticles each having a fluoroalkyl group. The method includes sweeping the mixture through the geological formation. The injecting and the sweeping give nanoflooding of the geological formation with the mixture to increase oil recovery from a hydrocarbon reservoir in the geological formation.

Yet another aspect relates to a polymer for polymer flooding of a geological formation. The polymer is a partially-hydrolyzed copolymer of fluoroalkyl acrylate and acrylamide.

Yet another aspect relates to a polymer nanoparticle for nanoflooding of a geological formation. The polymer nanoparticle includes a fluoroalkyl group on a particle surface of the polymer nanoparticle.

Yet another aspect relates to a surface-treated nanoparticle for nanoflooding. The surface-treated nanoparticle is a silica nanoparticle having a fluoroalkyl group on a particle surface of the silica nanoparticle.

The details of one or more implementations are set forth in the accompanying drawings and the description to be presented. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Figure 1:
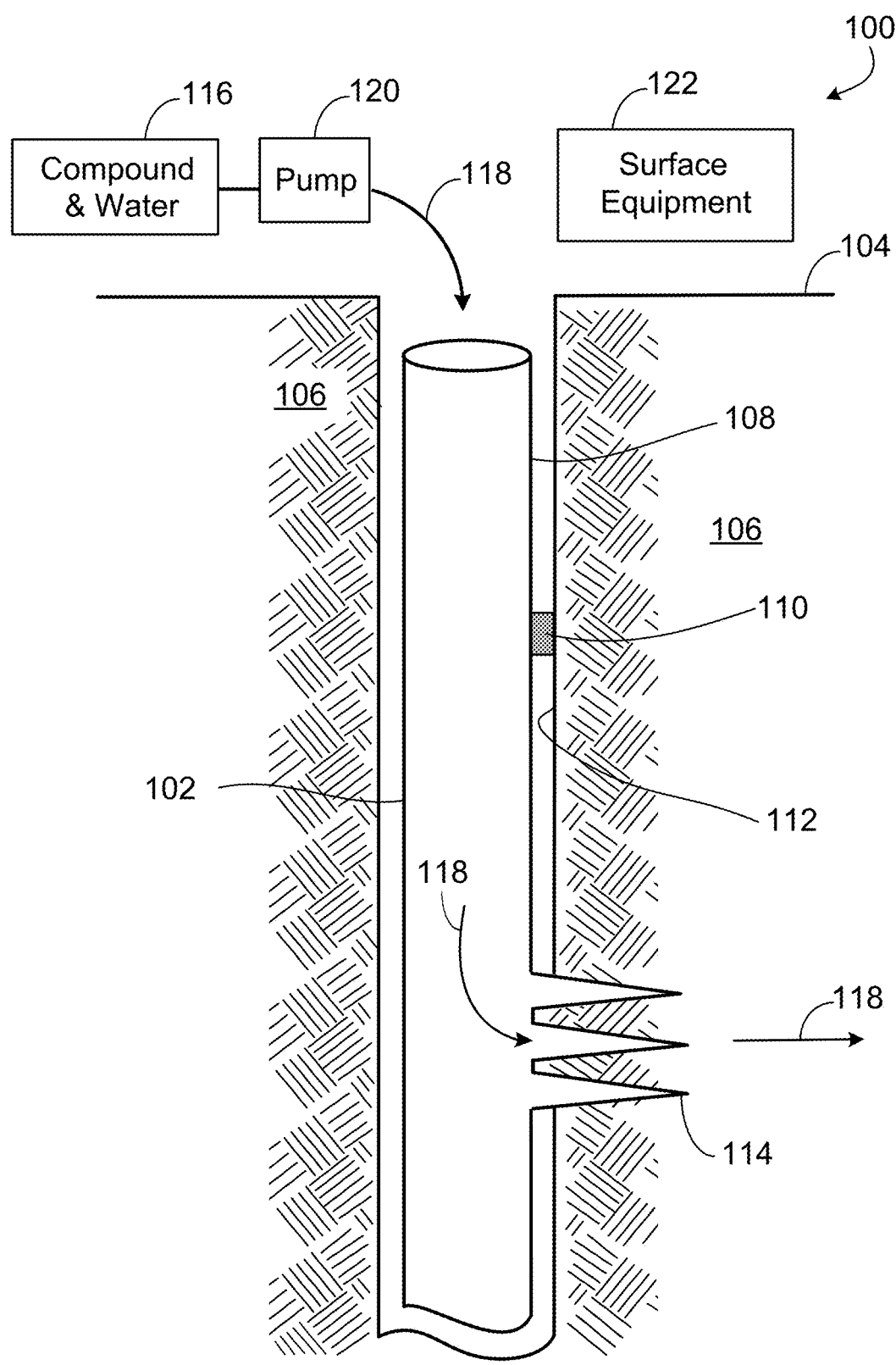
FIG. 1 is a diagram of a well site for EOR flooding of a geological formation.

EOR may involve chemical injection in a waterflood. The EOR may be polymer waterflooding. The chemical injected may be surfactants and polymer. The injection of polymer in water may be labeled as polymer flooding or polymer waterflooding. In some implementations, the specified polymer mass concentration in the injected water is in the range of 200 parts per million (ppm) to 1500 ppm or in the range of 200 ppm to 5000 ppm. EOR may also involve the injection of nanoparticles or polymer nanoparticles in water to provide for nanoflooding (nanofluid flooding) or polymer nanoflooding. Some implementations of the nanoparticles may also be employed as tracers through the geological formation in tracer applications.

Polymer flooding (polymer waterflooding) may be an EOR technique utilizing water viscosified with soluble polymers. In some implementations, viscosity of the water (with polymer) is increased until the mobility of the injected water (with polymer) is less than that of the oil phase in place so that the mobility ratio is less than unity. This condition may increase oil-recovery sweep efficiency. Polymer water flooding can be applied, for example, to heterogeneous reservoirs. The mixture of water and polymer injected can enhance sweep of zones with less permeability (for example, less than one millidarcy). The mixture of polymer and water can have a viscosity greater than 100 centipoise (cP).

Xanthan, such as xanthan gum polymer, is an example of polymer in polymer waterflooding. The polymeric structures (a), (b), and (c) may also be employed in polymer flooding. The polymeric structure (a) is polyacrylamide (PAM). The polymeric structure (b) is hydrolyzed PAM (HPAM). The polymeric structure (c) is partially hydrolyzed HPAM. Present embodiments provide for additional polymeric structures that may be utilized in flooding, such as polymeric structures having a fluoroalkyl group to reduce retention of the polymeric structure.

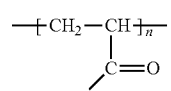

Polyacrylamide (PAM)

(a)

-continued

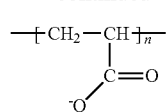

Hydrolyzed PAM (b)

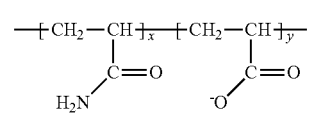

Partially Hydrolyzed Polyacrylamide (HPAM)

(c)

The present disclosure relates to low-retention polymers and nanoparticles for polymer flooding or nanoflooding. As for "low-retention," the retention of the present polymers may be, for example, less than 100 microgram (μg) (or less than 200 μg) of polymer per gram (g) of reservoir rock or less than 20 μg of polymer per cubic centimeter (cm3) of reservoir-rock bulk volume for the intended reservoir. These numerical values or criteria for retention may be affected by or depend on permeability of the reservoir rock, polymer concentration, and flow rate. The polymer retention may be reported as mass of polymer adsorbed per unit mass of reservoir rock. The polymer retention may be reported as mass of polymer adsorbed per unit volume of reservoir rock.

Some aspects of the present disclosure are directed to polymers synthesized for polymer waterflooding and nanoflooding. Core flood testing and quartz-crystal microbalance (QCM) testing of these synthesized polymers may be considered. Core flood or core flooding may be a test to determine permeability of a core sample as placed in a core holder, injected with fluid, and subjected to triaxial stress. A QCM generally measures a mass variation per unit area of the sample by measuring the change in frequency of a quartz crystal resonator.

FIG. 1 is a well site 100 having a wellbore 102 formed through the Earth surface 104 into a geological formation 106 in the Earth crust. The well site 100 is utilized for flooding of the geological formation 106 as tertiary recovery or EOR. The well may be an injection well. The well may be a producing well in which production is suspended or ended. An injection well may be a well in which fluids are injected rather than produced. Injection wells generally may provide for the fluid injection to maintain reservoir pressure or for flooding, chemical injection, or fluid disposal.

In the illustrated implementation, the wellbore 102 includes casing 108. Cement 110 is disposed in the annulus between the casing 108 and the surface 112 of the geological formation 206. Perforations 114 are formed through the casing 108 wall and cement 110 into the geological formation 106. In the illustrated embodiment, a vessel 116 is disposed at the Earth surface 104 adjacent the wellbore 102. The vessel 116 may be, for example, a stand-alone vessel or a container on a vehicle.

The vessel 116 holds a mixture 118 of at least a compound and water for flooding of the geological formation 106. The compound has a fluoroalkyl group to reduce retention of the compound in the geological formation 106. The mixture 118 may also include, for example, salt or surfactant. In some implementations, the water in the mixture 118 is seawater or brine. The compound may be at a specified concentration in the mixture 118. For the compound as a polymer soluble in water, the polymer may in the mixture 118 at a concentration, for example, in the range of 200 ppm to 1500 ppm.

In operation for the flooding, the mixture 118 is provided via a motive device, such as a pump 120, to the internal cavity of the casing 108 of the wellbore 102. Controls, such as flow controls, may be associated with the provision of the mixture 118. For example, a control system may adjust the speed of the pump to maintain or modulate flow rate of the mixture 118. In another example, a control valve (for example, on a discharge conduit of the pump 120) may maintain or modulate the flow rate of the mixture 118. In some implementation, the set point for flow rate may input by a user via the control system or the set point may be input or altered by control logic.

The mixture 118 is pumped or flows through the perforations 114 into the geological formation 106 for the flooding. This injection of the mixture 118 may provide for sweep of the mixture 118 through the geological formation 106 to displace crude oil (and natural gas) to a producing well. This displacement may increase production of the producing well or increase recovery of crude oil from the geological formation 106. The oil may be in a hydrocarbon reservoir in the geological formation 106. In certain implementations, after injection of the mixture 118, water or fluid may be pumped or injected through the perforations 114 into the geological formation 106 as a drive fluid.

Lastly, the well site 100 may have surface equipment 110 that may support the EOR or flooding operation. The surface equipment 110 may also include a rig to drill boreholes and equipment to place and cement the casing 108. Power supply, control system, computers, and a mobile laboratory may be at the Earth surface 104.

As indicated, the compound in the mixture 118 may be selected in part to decrease retention or adhesion of the compound and mixture 118 in rock pores of the geological formation 118. In embodiments, the compound is selected as having a fluoroalkyl group to decrease retention and reduce adhesion.

In certain embodiments, the compound is a polymer having the fluoroalkyl group. Thus, the flooding may be a polymer flooding. In a particular embodiments, the polymer is an ionic-fluoro copolymer or a partially-hydrolyzed copolymer of fluoroalkyl acrylate and acrylamide. As discussed later, the polymer may instead be polymer nanoparticles (for example, random copolymer nanoparticles) having the fluoroalkyl group. Thus, in those implementations, the flooding may be a nanoflooding. In one implementation, the polymer nanoparticles are core-shell nanoparticles with the core as a polystyrene center and the shell including both a zwitterionic group and a fluoro functional group having the fluoroalkyl group.

In some embodiments, the compound is a nanoparticle (for example, silica nanoparticle) having the fluoroalkyl group (for example, on the surface of the nanoparticles). The nanoparticle may include an ionic-fluoro surface functionalization having the fluoroalkyl group. In one embodiment, the nanoparticle includes a surface treatment or coating from a treatment mixture of a fluorinated alkyl compound and a zwitterionic polymer. The fluorinated alkyl compound gives the fluoroalkyl group.

Described herein are polymer structures or surface treatments containing fluoro-functional groups for reducing retention in rock formations. Features addressed may be low-retention ionic-fluoro copolymers, low-retention 'ionic-fluoro' surface functionalization, and low-retention polymer nanoparticles for interwell range. Additional aspects herein may be a QCM technique for characterizing the retention of these polymers. These polymers (for example, having a fluoro group) may be (a) low-retention zwitterion polymers with or without an amine group on a phenyl ring and (b) low-retention zwitterion polymers without phenyl rings. The QCM characterization may facilitate identifying the influence of a fluoro group. In general, a "zwitterion" is a molecule with two or more functional groups in which at least one has a positive electrical charge, at least one has a negative electrical charge, and the net charge of the entire molecule is zero.

Embodiments of the present techniques can reduce polymer or nanoparticle retention in EOR or tracer applications. Core flooding testing may be performed for polymeric structures to be employed in polymer flooding. The determined retention may be, for example, in milligrams (mg) of polymer per gram of core rock sample.

Embodiments give at least three groups of polymers for polymer flooding: (1) low-retention ionic-fluoro copolymers; (2) low-retention polymers having 'ionic-fluoro' surface functionalization; and (3) low-retention polymer nanoparticles for interwell range. The interwell range may be for the volumetric sweep in polymer flooding to an adjacent well.

Figure 2:
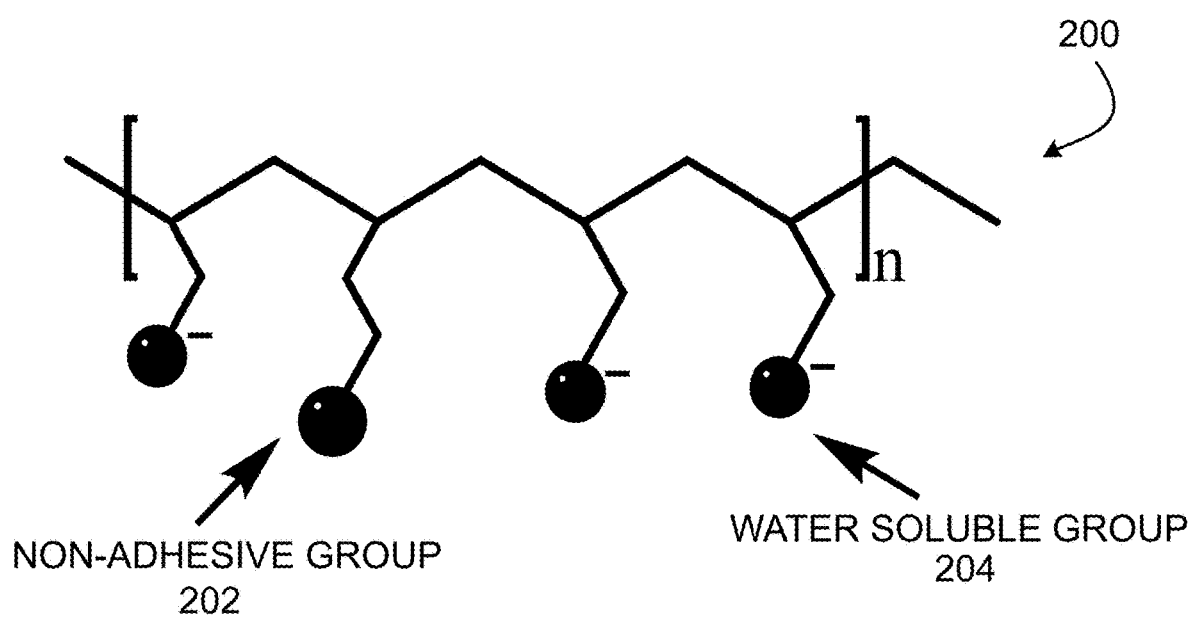
FIG. 2 is a diagram of a polymeric structure having a fluoro functional group.
Figure 3:
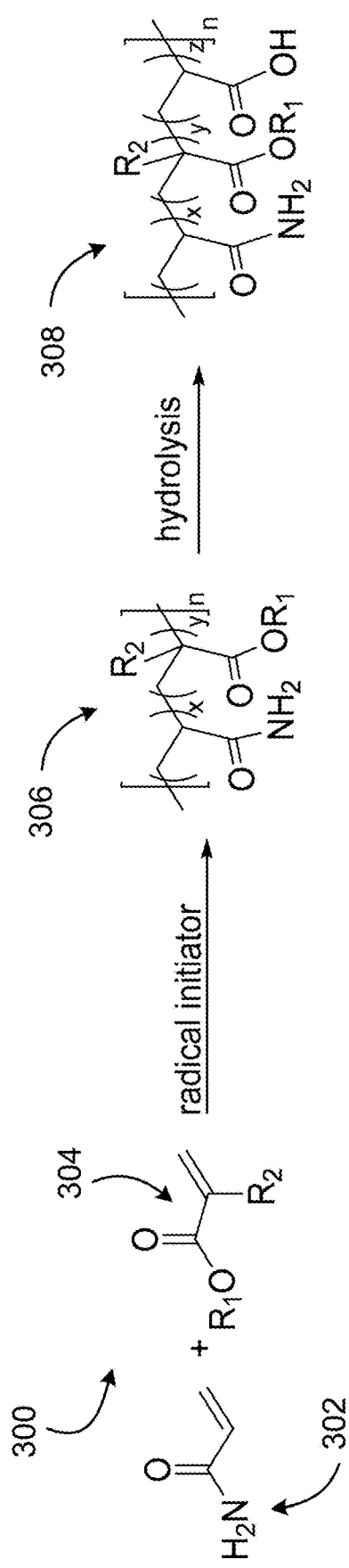
FIG. 3 is a route diagram of a radical polymerization of acrylamide with acrylate or methacrylate having a fluoro group to form a copolymer of fluoroalkyl acrylate and acrylamide.
Figure 4:
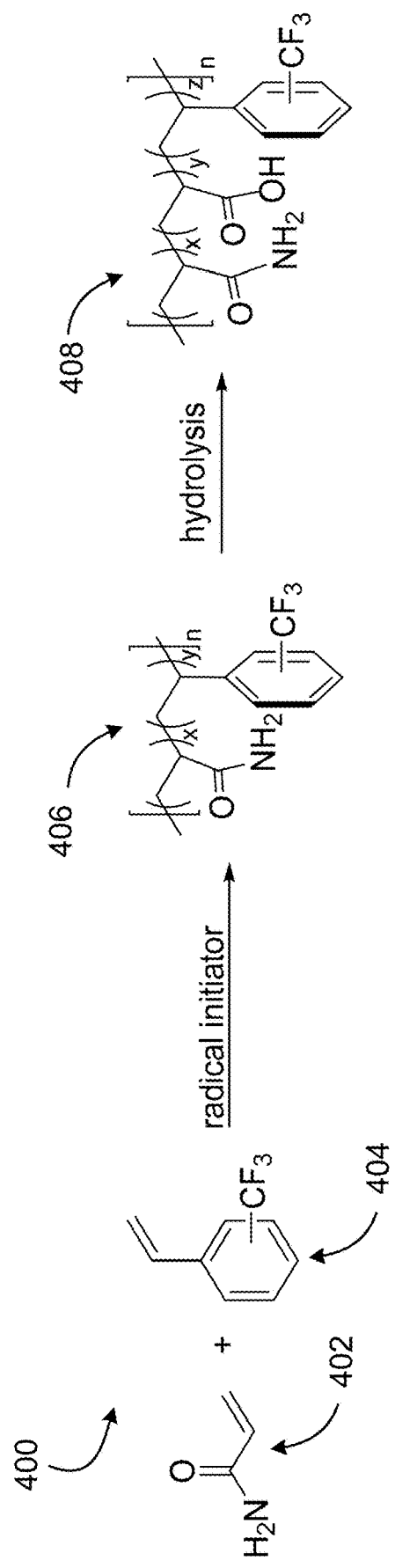
FIG. 4 is a route diagram of a radical polymerization of acrylamide with fluoroalkyl styrene to form a copolymer of fluoroalkyl acrylate and acrylamide.

FIG. 2 is an example of a polymeric structure 200 incorporating HPAM and fluoro functional groups. Examples of the low-retention ionic-fluoro copolymers resemble a modified HPAM having fluoro functional groups, as depicted generally in FIG. 2. The non-adhesion group 202 is the added fluoro group. A non-adhesion group in the present disclosure may be defined generally as the group containing fluoro functions. The water soluble group 204 is the typical HPAM group. The fluoro functionalization affects the behavior and transport of these types of copolymers in aqueous solutions and inside porous media. The functionalization may be accomplished through radical polymerization. FIG. 3 and FIG. 4 depict respective examples of such functionalization through radical polymerization of the organic compound acrylamide having the chemical formula $CH_2=CHC(O)NH_2$.

FIG. 3 is a radical polymerization 300 of acrylamide 302 with acrylate 304 (or methacrylate 604) having a fluoro group R1 to form a copolymer 306 of fluoroalkyl acrylate and acrylamide. The mole percent (mol %) of the acrylate 304 in the polymerization mixture may be less than 10 mol %. Next, hydrolysis produces the partially hydrolyzed copolymer 308 of fluoroalkyl acrylate and acrylamide. The copolymer 308 may be liquid or solid. These copolymers 308 represented by the depicted polymeric structure may be utilized in polymer flooding. The polymer 308 may be in solution in water for the polymer flooding. The polymer 308 may be dissolved in water or suspended in water. The polymeric structure 308 may be characterized as HPAM having fluoroalkyl groups.

FIG. 4 is a radical polymerization 400 of acrylamide 402 with fluoroalkyl styrene 404 to form a copolymer 406 of fluoroalkyl acrylate and acrylamide. The mole percent (mol %) of the fluoroalkyl styrene 404 in the polymerization mixture may be less than 10 mol %. Next, hydrolysis produces the partially hydrolyzed copolymer 408 of fluoroalkyl acrylate and acrylamide. These copolymers 408 represented by the depicted polymeric structure may be utilized in polymer flooding. The copolymer 408 may be in solution in water for the polymer flooding. The copolymer 408 may be dissolved or suspended in the water. The polymeric structure 408 may be characterized as HPAM copolymer having a fluoroalkyl group that in this particular example is a fluoromethyl styrene group.

However, acrylamide unfortunately may be hydrolyzed in water at high temperatures (for example, greater than 100° C.) over time (for example, greater than one month) to form acrylic acid groups that can interact with divalent cation in brines and thus reduce the viscosity of the polymer solution. To overcome this problem, the terpolymers represented in FIG. 5 may be utilized in polymer flooding.

Figure 5:
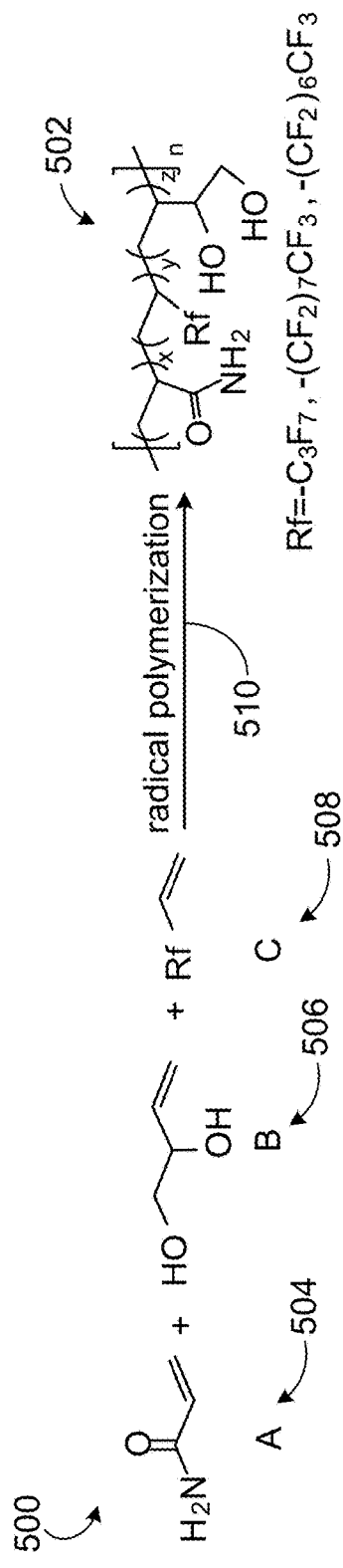
FIG. 5 is a diagram of options for syntheses of various terpolymers that may be employed in polymer flooding.

FIG. 5 depicts options for syntheses 500 of various terpolymers 502 that may be employed in polymer flooding. In the syntheses 500, three monomers (including hydrophilic monomers) or reactants are polymerized via a radical polymerization 510 to give the terpolymer 502. The reactants in these embodiments are reactant A 504, reactant B 506, and reactant C 508.

The reactant A 504 can be an acrylamide or a derivative of acrylamide. For example, the reactant A 504 can be N-vinylformamide, N-alkyl acrylam ides and N-alkyl quarternary acrylam ides. The alkyl group can be in the range of two carbons (C2) to twenty-eight carbons (C28). The reactant A 504 can be N-methyl(meth)acrylamide, N,N'-dimethyl(meth)acrylamide, and N-methylolacrylamide. The reactant A 504 can also be N-vinyl derivatives, such as N-vinylformamide, N-vinylacetamide, N-vinylpyrrolidone or N-vinylcaprolactam. The reactant A 504 can be vinyl esters, such as vinyl formate or vinyl acetate.

Figure 6:
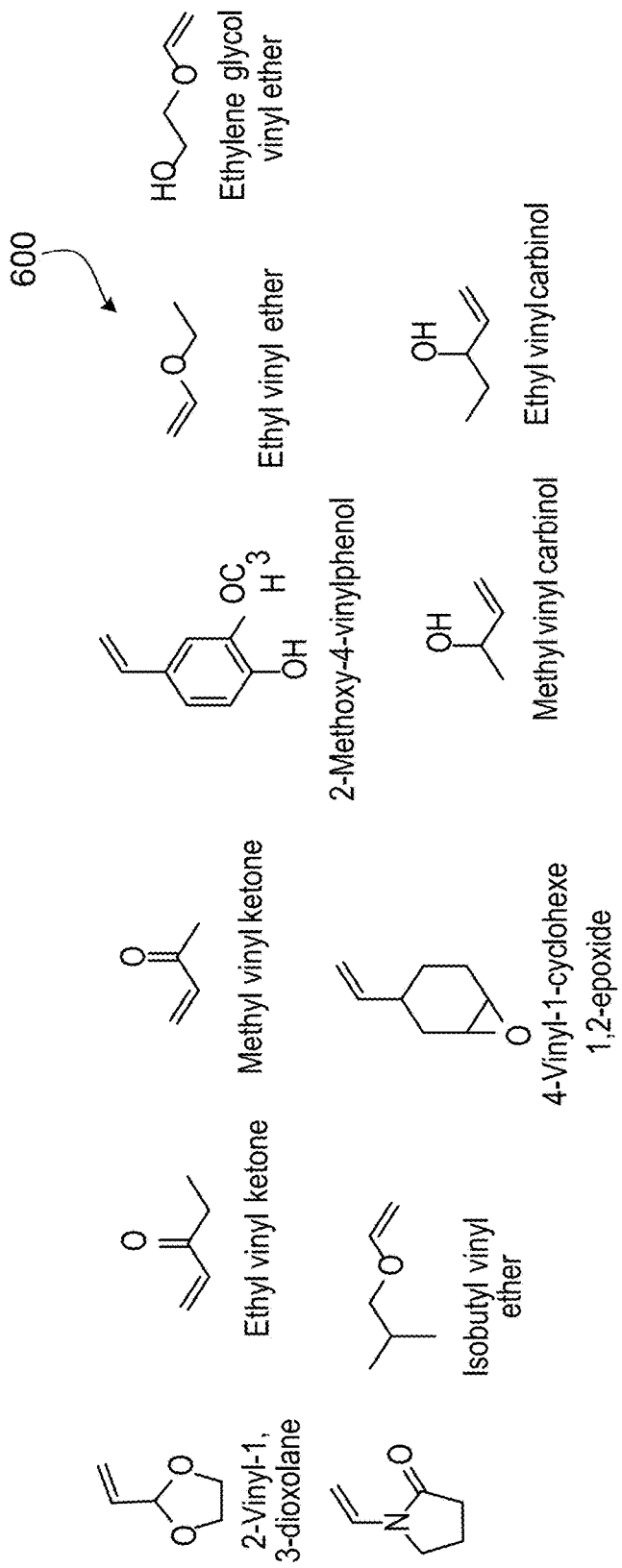
FIG. 6 is a diagram of monomer structures that can be a reactant in the syntheses of FIG. 5.

The reactant B 506 in the polymerization can be, for example, allyl alcohol, acrylonitrile, vinyl sulfide, vinyl sulfone, vinyl ketone, a vinyl ether (for instance, N-vinylpyrrolidone or N-vinylecaprolactam), hydroxyethyl (meth)acrylate, hydroxypropyl(meth)acrylate, allyl alcohol, hydroxyvinyl ethyl ether, hydroxyl vinyl propyl ether, hydroxyvinyl butyl ether, (meth)allyl alcohol, hydroxyethyl vinyl ether, and ethylene glycol monoallyl ether. FIG. 6 depicts monomer structures 600 that can be the reactant B 506.

Figure 7:
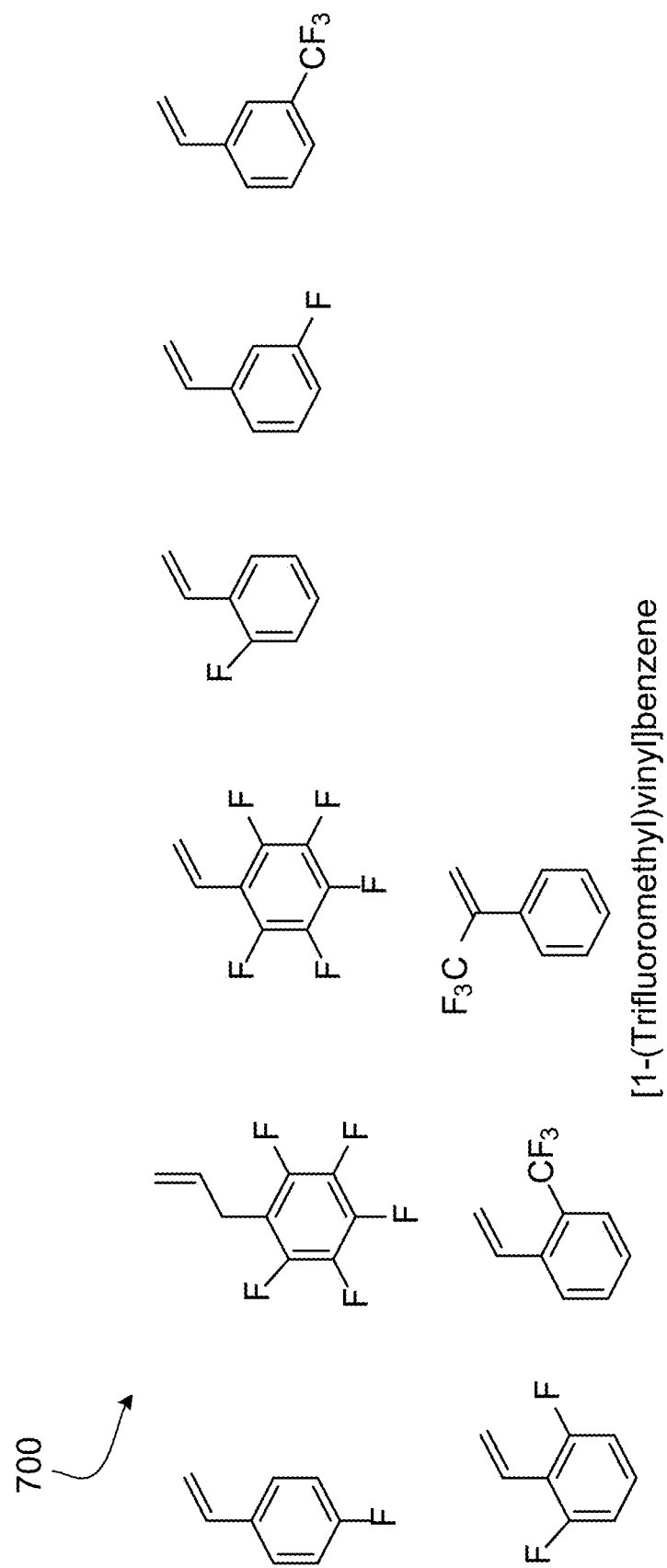
FIG. 7 is a diagram of monomer structures that can be a reactant in the syntheses of FIG. 5.

The reactant C 508 can be, for example, fluoroalkyl (or perfluoroalkyl) vinyl monomers, fluoroalkyl (or perfluoroalkyl) acrylates, fluoroalkyl (or perfluoroalkyl) methacrylates, and fluoro (or perfluoro) styrenic monomers. Particular implementations include 1H,1H,2H-perfluoro-1-hexene, 1H,1H,2H-perfluoro-1-decene, 1H, 1H,2H-perfluoro-1-octene, 2,3,4,5,6-pentafluorostyrene, 2-fluorostyrene, 3-fluorostyrene, 4-fluorostyrene, 2,6-difluorostyrene, and 4-(trifluoromethyl)styrene. Examples of acrylic fluorinated monomers that may be employed at reactant C 508 include hexafluoroisopropyl methacrylate, IH,IH-perfluoro-n-decyl methacrylate, hexafluoroisopropyl acrylate, 2,2,2-trifluoroethyl methacrylate, IH,IH-per-fluoro-n-decyl acrylate, IH,IH-perfluoro-n-octyl methacrylate, and IH,IH-perfluoro-n-octyl acrylate. FIG. 7 depicts monomer structures 700 that can be the reactant C 508.

The aforementioned syntheses of polymers and the surface functionalization of nanoparticles discussed later may be implemented on commercial scale. The production per day of polymer or functionalized nanoparticles may range, for example, from ten kilograms (kg) to a thousand metric tons. The industrial equipment for the polymerizations or surface functionalization may include reactor vessels as continuous reactors, semi-batch reactors, or batch reactors. In some implementations, a continuous flow reactor in a semi-batch reactor system may be employed.

Figure 8:
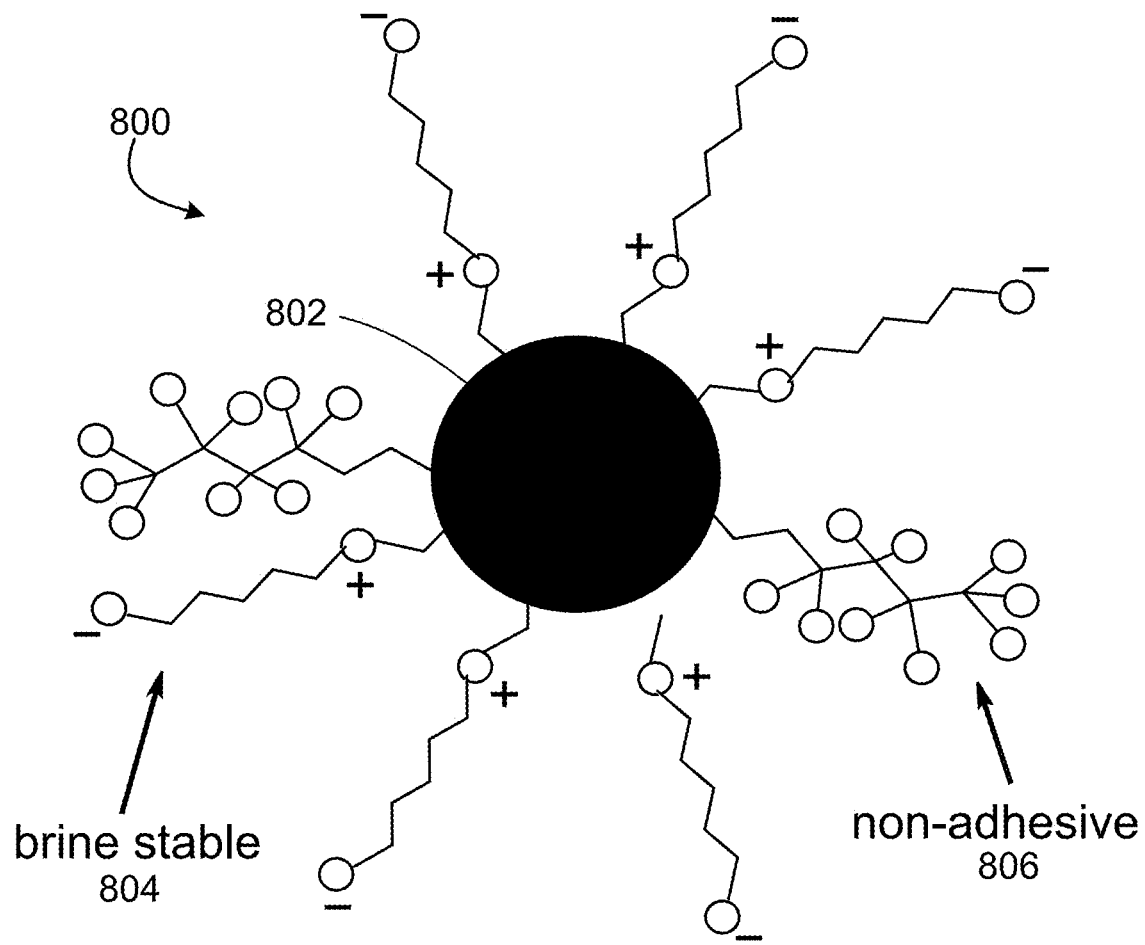
FIG. 8 is a diagram of a nanoparticle with a zwitterionic surface treatment and a perfluoro surface treatment.

Nanoparticles may be utilized in nano waterflooding or nanoflooding. To reduce retention of the nanoparticles, present embodiments perform an 'ionic-fluoro' surface functionalization of the nanoparticles. A copolymer may be synthesized and grafted onto the nanoparticle surface as coating. However, instead of synthesizing a copolymer and then grafting the copolymer to the surface of nanoparticles as coatings, molecular coupling agents with mixed functional groups may be utilized to functionalize particle surfaces. For example, applying a mixture of zwitterionic and perfluoro silane to the surface of nanoparticles can result in brine stable and low-retention nanoparticles, as generally depicted in FIG. 8. Embodiments innovatively provide for a combination of of zwitterion and fluoro surface treatment for nanoparticles to reduce retention or adsorption on rock surfaces.

FIG. 8 is a nanoparticle 800 with a mixture of zwitterionic and perfluoro surface treatments. The treatment of the surface 802 of the nanoparticle 800 with the zwitterionic polymer gives the brine-stable groups 804 at the surface 802 of the nanoparticle 800. The treatment of the surface 802 with the perfluoro groups gives the non-adhesion groups 806 at the surface 802 of the nanoparticle 800.

Figure 9:
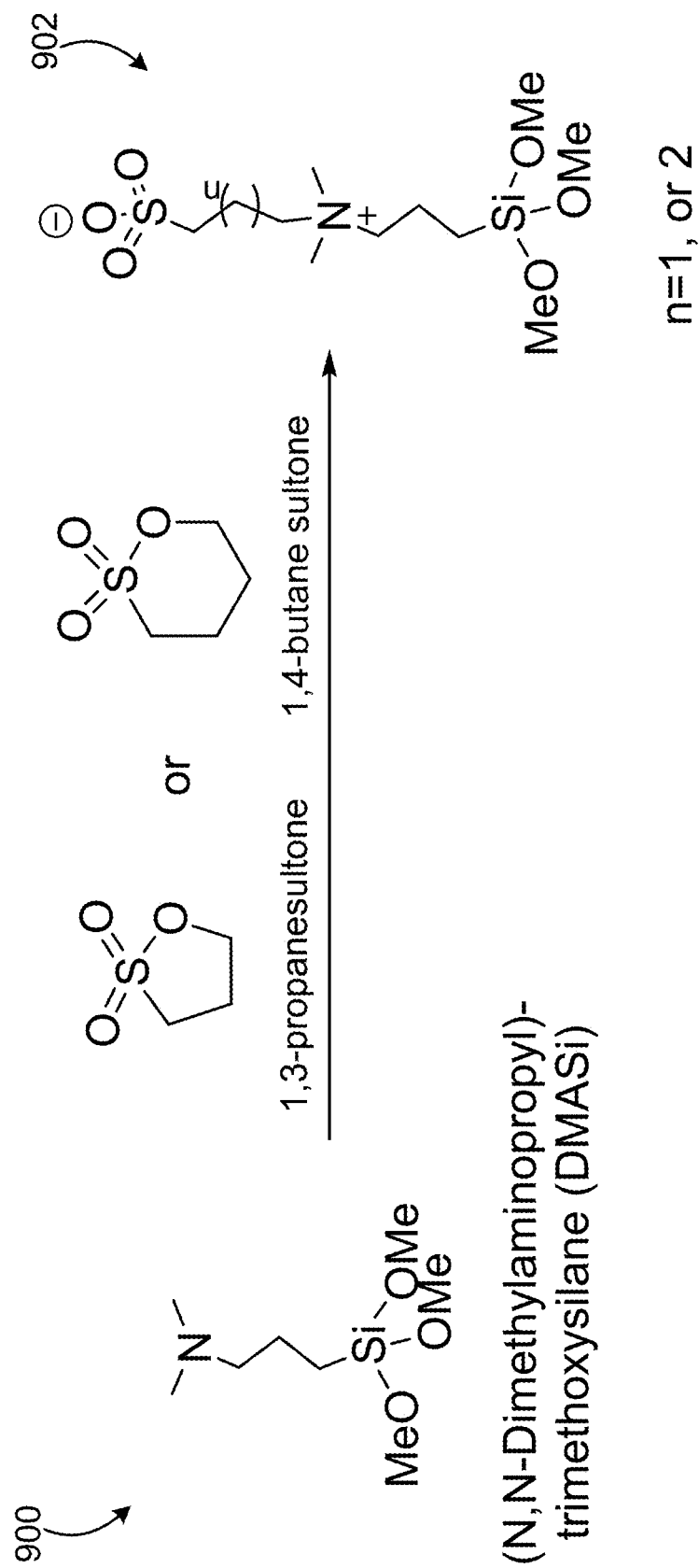
FIG. 9 is route diagram of synthesis of a zwitterionic polymer.

FIG. 9 is an example of synthesis 900 of a zwitterionic polymer such as zwitterionic silane compounds 902 (zwitterionic silane agents). The synthesis 900 is a synthetic route for making zwitterionic silanes 902. The zwitterionic silane 902 or similar zwitterionic polymeric molecule may be applied in a surface treatment of a nanoparticle (for example, as in FIG. 10) to give a surface-treated nanoparticle for polymer flooding or nanoflooding.

Figure 10:
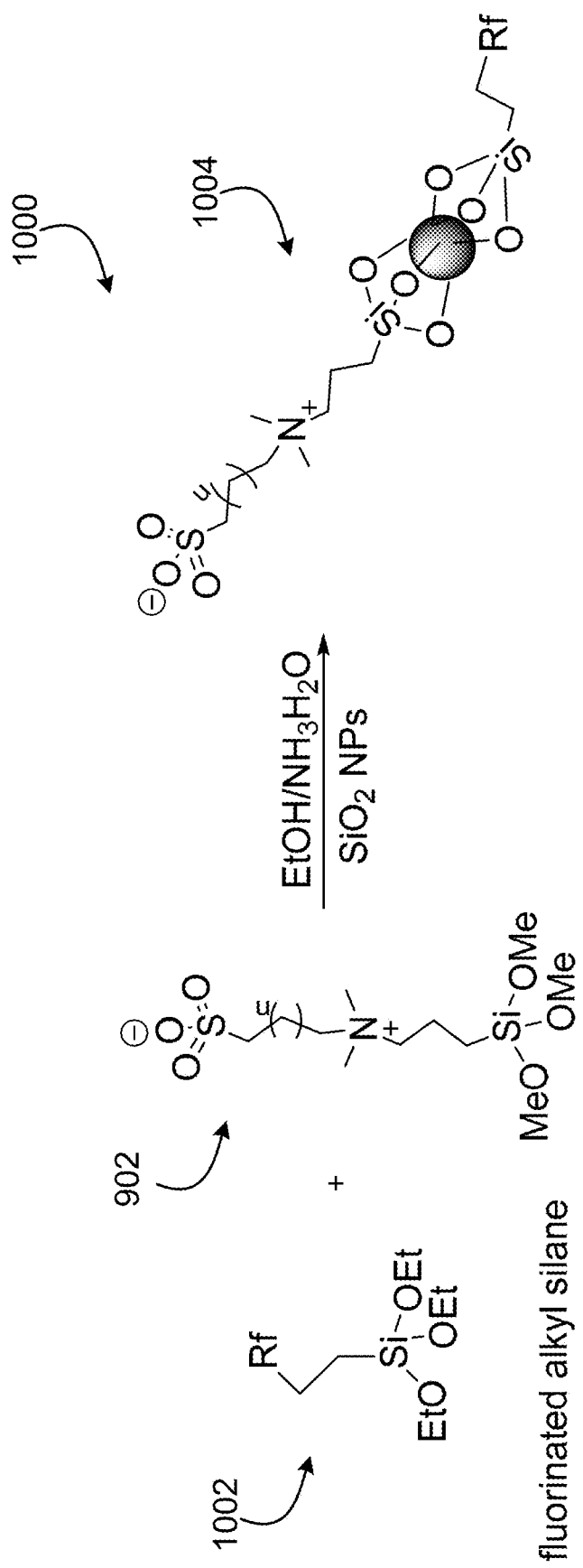
FIG. 10 is a diagram of a surface treatment of a nanoparticle.

FIG. 10 is a surface treatment 1000 of a nanoparticle that is a metal oxide. The depicted silicon dioxide (SiO2) is given as an example of a metal oxide. Alternatives to metal-oxide nanoparticles may be carbon nanotubes or graphene as nanomaterials.

The surface treatment 1000 may be characterized as a coating in certain implementations. In the illustrated embodiment, the nanoparticle is surface treated 1000 with a mixture of the zwitterionic silanes 902 (formed in FIG. 9) and commercially-available fluoroalkyl silanes 1002 in alkaline conditions to give the surface-treated nanoparticle 1004. Thus, the nanoparticle (for example, silica nanoparticle) is surface treated 1000 with fluoroalkyl silane 1002 and a zwitterionic silane. The zwitterionic silaneis, for example, the zwitterionic silane compound 902. The fluoroalkyl silane 1002 has a fluoroalkyl group Rf. In the illustrated embodiment, the fluoroalkyl group (Rf) is a non-polymer functional group attached to the silane and not directly to the silica nanoparticle surface. Two types of silanes are attached to metal oxide (SiO2 as an example here) particles. One type of silane has a zwitterion group and the other type has a fluoroalkyl group.

Thus, the surface treatment or coating on the silica nanoparticle may be mixed silanes (for example, zwitterionic silane) and a silane associated with a functional group (for example, fluorinated alkyl group) that includes a fluoro alkyl group. An example of the fluorinated alkyl silane 1002 is tridecafluorooctyl-triethoxysilane or similar fluorinated silane. As indicated, the surface-treated nanoparticle 1004 may be utilized in polymer flooding or nanofluid flooding.

Figure 11:
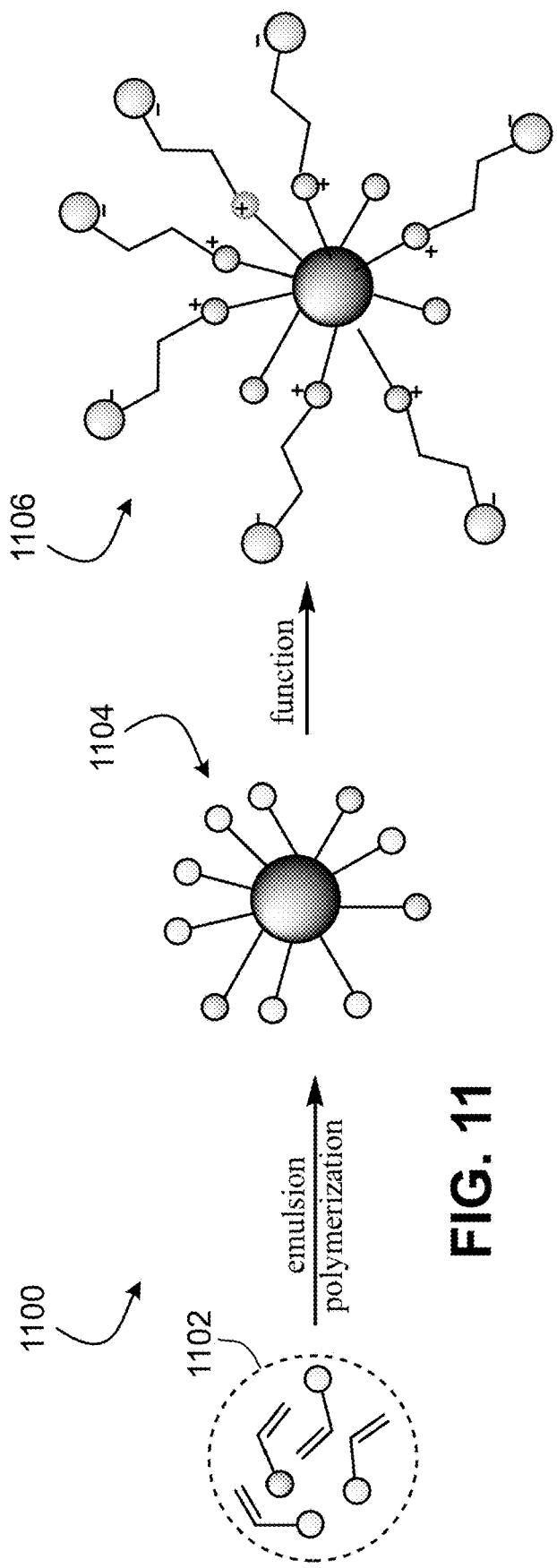
FIG. 11 is a route diagram of the polymerization of polymer nanoparticles.

FIG. 11 is a general example of a polymerization 1100 of low-retention polymer nanoparticles for interwell range. An interwell range may be the distance, for example, from an injection well to a producing well. The polymerization 1100 includes an emulsion polymerization of a mixture 1102 of vinylimidazole and trifluoromethyl styrenes in sodium dodecyl sulfate (SDS) and water to form a polymer nanoparticle 1104. The emulsion polymerization is followed by functionalization with zwitterions which can generate random copolymer nanoparticles 1106 having zwitterionic brine stable and non-adhesive properties. Thus, the polymer nanoparticle 1106 has both zwitterionic and non-adhesive functions. The polymer nanoparticle 1106 can be used in polymer nanoparticle flooding.

Figure 12:
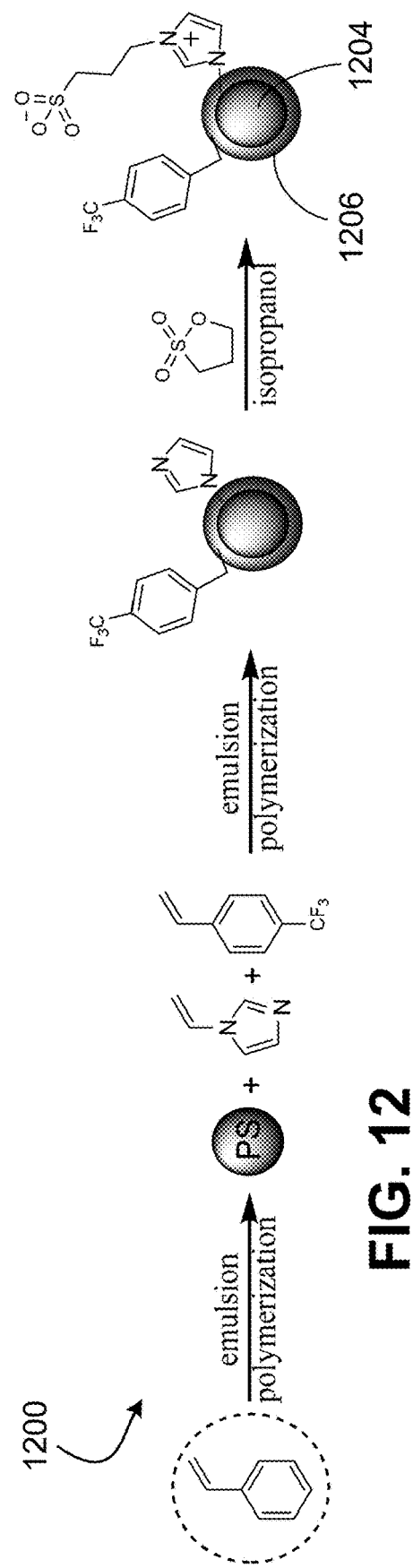
FIG. 12 is a route diagram of an emulsion polymerization of polymer nanoparticles.

FIG. 12 is a particular example of an emulsion polymerization 1200 of low-retention polymer nanoparticles for interwell range. The emulsion polymerization 1200 may synthesize core-shell nanoparticles 1202. In the illustrated embodiment, the emulsion polymerization gives core-shell nanoparticles with a styrene center 1204 and a shell 1206 composed of zwitterionic and fluoro functional groups. Thus, FIG. 12 depicts a scheme for making styrene nanoparticles with a mixture of zwitterionic and fluoro functional groups.

The aforementioned polymers synthesized for polymer waterflooding and nanoflooding may be subjected to core flood testing and QCM testing. Core flood or core flooding may be a test to determine permeability of a core sample as placed in a core holder, injected with fluid, and subjected to triaxial stress. Core flood is an instrument which holds core sample (cylindrically cut rock) under reservoir conditions and allows flow of the liquid through the rock pores. Core flooding is a test with liquid transported through the pores of the rock sample. Measurement allows to quantify if flow of liquid through the rock pores cause damage to the rock (for example, plugs pores, reduces size of the pores, or damages porous structure) and if there is a temporary or permanent retention of the liquid to the surface of the rock. A QCM generally measures a mass variation per unit area of the sample by measuring the change in frequency of a quartz crystal resonator. Retention of the polymers may be calculated from the QCM instrument reading provided by the instrument executed code.

Figure 13:
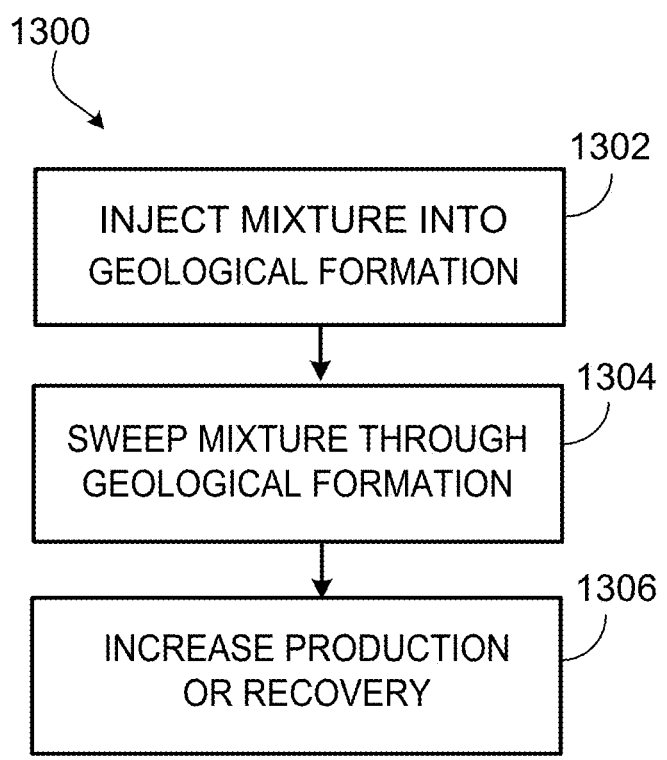
FIG. 13 is a method of EOR.

FIG. 13 is a method 1300 of enhanced oil recovery (EOR). The method may include flooding a geological formation to increase oil production from a well or oil recovery from the geological formation. In some embodiments, the flooding is initiated at an injection well. The increased production may be at an adjacent producing well.

At block 1302, the method includes injecting a mixture through a wellbore into the geological formation. The injecting may involve pumping the mixture through the wellbore into the geological formation. The mixture includes water and a compound, wherein the compound has a fluoroalkyl group including fluorine. The mixture may also include salt, surfactant, and other components. In some instances, the water is seawater or brine.

The compound in the injected mixture may be a polymer having the fluoroalkyl group, such as an ionic-fluoro copolymer. Thus, the flooding may be polymer flooding. The polymer having the fluoroalkyl group may be a partially-hydrolyzed copolymer of fluoroalkyl acrylate and acrylamide. For example, the partially-hydrolyzed copolymer of fluoroalkyl acrylate and acrylamide have the following polymeric structures:

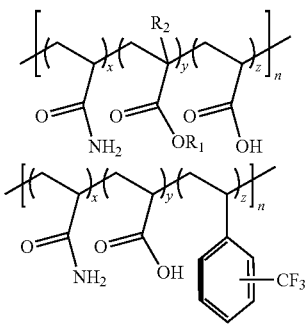

where R1 is —CH2CF3, —CH(CF3)2, or —C(CF3)3, and where R2 is H or CH3.

The compound in the injected mixture may be polymer nanoparticles having the fluoroalkyl group. Thus, the flooding may be polymer nanoflooding. In certain embodiments, the polymer nanoparticles are random copolymer nanoparticles having the fluoroalkyl group. In embodiments, the polymer nanoparticles may be prepared by emulsion polymerization followed by functionalization. In some embodiments, a polymerization mixture of the emulsion polymerization includes vinylimidazole, trifluoromethyl styrene, a surfactant, and water. In some implementations, the polymer nanoparticles are core-shell nanoparticles with a polystyrene center as the core and with the shell having a zwitterionic group and a fluoro functional group. The fluoro functional group includes or is the fluoroalkyl group. In some implementations, the fluoro functional group can be one of the following:

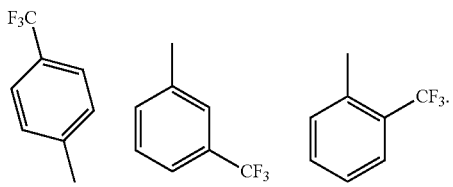

The compound in the injected mixture may be nanoparticles (for example, silica nanoparticles) having the fluoroalkyl group on a particle surface of the nanoparticle. Thus, the flooding may be nanoflooding. The nanoparticles may be surface-treated nanoparticles. In some examples, the fluoroalkyl group is associated with a silane on the surface of the nanoparticle. The nanoparticles may have an ionic-fluoro surface functionalization including the fluoroalkyl group. The nanoparticle may have a surface treatment from a treatment mixture of a fluorinated alkyl compound and a silane, the fluorinated alkyl compound giving the fluoroalkyl group. In some examples, the fluorinated alkyl compound is a fluorinated alkyl silane, and wherein the zwitterionic compound is a zwitterionic silane. The surface treatment of the nanoparticles may be characterized as a coating having the fluoroalkyl group in certain instances.

At block 1304, the method includes flooding the geological formation with the mixture. The mixture as injected may flow or sweep through the geological formation. In embodiments, the sweep of the injected mixture may be through the geological formation toward a producing well. The flooding may displace crude oil (and natural gas) in the geological formation toward or to the producing well.

At block 1306, the method includes increasing oil production of a producing well and/or oil recovery from the geological formation. Such is due to or in response to the injected mixture and associated flooding as EOR or tertiary recovery. The increased recovery may be from a hydrocarbon reservoir in the geological formation. The increased recovery may be from the geological formation as a heterogeneous formation.

An embodiment is a method of EOR, comprising: injecting a mixture through a wellbore into a geological formation, the mixture comprising water and a polymer having a fluoroalkyl group, wherein the polymer comprises an ionic-fluoro copolymer; and flooding the geological formation with the mixture. In implementations, the flooding of the geological formation increases oil production of a well.

An embodiment is a polymer for polymer flooding of a geological formation, the polymer comprising a partially-hydrolyzed copolymer of fluoroalkyl acrylate and acrylamide. In implementations, the partially-hydrolyzed copolymer of fluoroalkyl acrylate and acrylamide comprises the following polymeric structure:

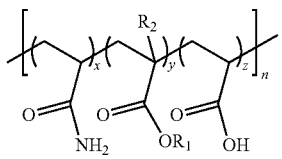

where R1 is —CH2CF3, —CH(CF3)2, or —C(CF3)3, and where R2 is H or CH3. In implementations, the partially-hydrolyzed copolymer of fluoroalkyl acrylate and acrylamide comprises the following polymeric structure:

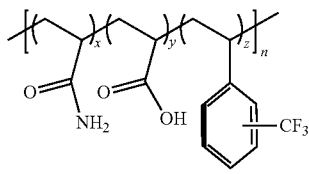

An embodiment is a polymer nanoparticle for nanoflooding of a geological formation, the polymer nanoparticle having a fluoroalkyl group on a particle surface of the polymer nanoparticle. In implementations, the polymer nanoparticle is a random copolymer nanoparticle having the fluoroalkyl group on the particle surface of the random copolymer nanoparticle. In implementations, the polymer nanoparticle is a core-shell nanoparticle having a core and a shell, wherein the core comprises a polystyrene center, and wherein the shell comprises a zwitterionic group and a fluoro functional group comprising the fluoroalkyl group. The fluoro functional group may comprise at least one of the following structures:

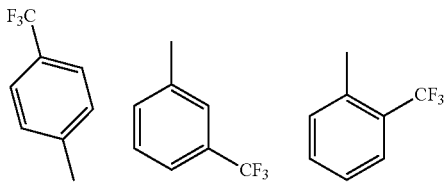

An embodiment is a method of EOR, comprising: injecting a mixture through a wellbore into a geological formation, the mixture comprising water and a nanoparticle having a fluoroalkyl group on a particle surface of the nanoparticle; and flooding the geological formation with the mixture. In implementations, the fluoroalkyl group is in a surface treatment of the nanoparticle, and wherein the nanoparticle comprises SiO2. In implementations, the nanoparticle comprises an ionic-fluoro surface functionalization comprising the fluoroalkyl group. In implementations, the nanoparticle comprises a surface treatment from a treatment mixture comprising a fluorinated alkyl compound and a zwitterionic compound, the fluorinated alkyl compound giving the fluoroalkyl group. The fluorinated alkyl compound may comprise a fluorinated alkyl silane, wherein the zwitterionic compound comprises a zwitterionic silane compound. In implementations, the nanoparticle comprises a coating comprising the fluoroalkyl group.

An embodiment is a method comprising: pumping a mixture through a wellbore into a geological formation, the mixture comprising a surfactant, salt, water, and nanoparticles having a fluoroalkyl group; and flowing the mixture through the geological formation, wherein the pumping and the flowing comprise EOR comprising flooding, wherein the flooding of the geological formation increases oil recovery from a reservoir in the geological formation, and wherein the flooding comprises nanofluid flooding. In implementations, the fluoroalkyl group is associated with a particle surface of the nanoparticles. In implementations, the nanoparticles comprise surface treatment having the fluoroalkyl group. In implementations, the nanoparticles comprise coating having the fluoroalkyl group. In implementations, the nanoparticles are prepared by surface treating silica nanoparticles with a zwitterionic silane and a fluorinated alkyl silane, the fluorinated alkyl silane giving the fluoroalkyl group.

An embodiment is a method comprising: injecting a mixture through a wellbore into a geological formation, the mixture comprising nanoparticles and water, wherein the nanoparticles each have a fluoroalkyl group; and sweeping the mixture through the geological formation, wherein the injecting and the sweeping comprise nanoflooding of the geological formation with the mixture to increase oil recovery from a hydrocarbon reservoir in the geological formation. In implementations, the nanoparticles comprise SiO2, wherein the nanoparticles have the fluoroalkyl group on a surface of the nanoparticles. In implementations, the nanoparticles having the fluoroalkyl group comprise an ionic-fluoro surface functionalization comprising the fluoroalkyl group. In implementations, the nanoparticles each comprise a surface treatment from a treatment mixture comprising a fluorinated alkyl compound and a zwitterionic compound, the fluorinated alkyl compound giving the fluoroalkyl group, wherein the surface treatment comprises a zwitterionic portion and the fluoroalkyl group.

An embodiment is a surface-treated nanoparticle for nanoflooding, the surface-treated nanoparticle comprising a silica nanoparticle having a fluoroalkyl group on a particle surface of the silica nanoparticle. In implementations, an ionic-fluoro surface functionalization of the silica nanoparticle comprises the fluoroalkyl group on the particle surface. In implementations, the surface-treated nanoparticle comprises a fluorinated alkyl portion comprising the fluoroalkyl group on the particle surface, wherein the surface-treated nanoparticle comprises a zwitterionic portion on the particle surface. The fluorinated alkyl portion may comprise a fluorinated alkyl silane, and wherein the zwitterionic portion comprises a zwitterionic silane compound. In implementations, the surface-treated nanoparticle comprises a coating comprising the fluoroalkyl group and a zwitterionic silane.

A number of implementations have been described. Nevertheless, it will be understood that various modifications may be made without departing from the spirit and scope of the disclosure.

What is claimed is:
1. A method comprising:
pumping a mixture through a wellbore into a geological formation, the mixture comprising a surfactant, salt, water, and a polymer having a fluoroalkyl group; and
flowing the mixture through the geological formation, wherein the pumping and the flowing comprise enhanced oil recovery (EOR) comprising flooding, wherein the flooding of the geological formation increases oil recovery from a reservoir in the geological formation, and wherein the flooding comprises polymer flooding or nanofluid flooding, or both, wherein the polymer having the fluoroalkyl group comprises a partially-hydrolyzed copolymer of fluoroalkyl acrylate and acrylamide, and the partially-hydrolyzed copolymer of fluoroalkyl acrylate and acrylamide comprises the following polymeric structure:

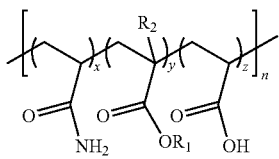

where R1 is —CH2CF3, —CH(CF3)2, or —C(CF3)3, and where R2 is H or CH3.

2. The method of claim 1, wherein the salt comprises sodium chloride.

3. The method of claim 1, wherein the water comprises seawater or brine.

4. A method of enhanced oil recovery (EOR), comprising:
injecting a mixture through a wellbore into a geological formation, the mixture comprising water and a partially-hydrolyzed copolymer of fluoroalkyl acrylate and acrylamide; and
flooding the geological formation with the mixture,
wherein the partially-hydrolyzed copolymer of fluoroalkyl acrylate and acrylamide comprises the following polymeric structure:

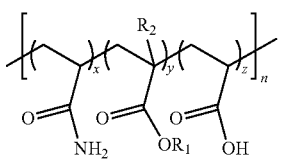

where R1 is —CH2CF3, —CH(CF3)2, or —C(CF3)3, and where R2 is H or CH3.

5. The method of claim 4, wherein the flooding of the geological formation increases oil production of a well.

* * * * *